United States Patent
Zhang et al.

(10) Patent No.: US 12,047,737 B2
(45) Date of Patent: Jul. 23, 2024

(54) ACOUSTIC OUTPUT APPARATUS

(71) Applicant: SHENZHEN SHOKZ CO., LTD., Guangdong (CN)

(72) Inventors: Lei Zhang, Shenzhen (CN); Junjiang Fu, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 104 days.

(21) Appl. No.: 17/652,480

(22) Filed: Feb. 24, 2022

(65) Prior Publication Data
US 2022/0360888 A1 Nov. 10, 2022

Related U.S. Application Data

(63) Continuation of application No. PCT/CN2020/106759, filed on Aug. 4, 2020.

(30) Foreign Application Priority Data

Sep. 19, 2019 (CN) .......................... 201910888067.6
Sep. 19, 2019 (CN) .......................... 201910888762.2

(51) Int. Cl.
*H04R 25/00* (2006.01)
*H04R 1/02* (2006.01)
(Continued)

(52) U.S. Cl.
CPC .............. *H04R 1/40* (2013.01); *H04R 1/023* (2013.01); *H04R 1/1008* (2013.01);
(Continued)

(58) Field of Classification Search
CPC .... H04R 1/023; H04R 1/1008; H04R 1/1075; H04R 1/345; H04R 7/04; H04R 7/18;
(Continued)

(56) References Cited

U.S. PATENT DOCUMENTS 4,899,390 A 2/1990 Takewa et al.
5,073,945 A 12/1991 Kageyama et al.
(Continued)

FOREIGN PATENT DOCUMENTS

CN 201616895 U 10/2010
CN 103108268 A 5/2013
(Continued)

OTHER PUBLICATIONS

Office Action in Russian Application No. 2022105654 mailed on Nov. 3, 2022, 17 pages.
(Continued)

*Primary Examiner* — Phylesha Dabney
(74) *Attorney, Agent, or Firm* — METIS IP LLC

(57) ABSTRACT

The present disclosure discloses an acoustic output apparatus. The acoustic output apparatus may include an acoustic driver. The acoustic driver may include a diaphragm and a magnetic circuit structure. A front side of the acoustic driver may be formed at a side of the diaphragm away from the magnetic circuit structure. A rear side of the acoustic driver may be formed at a side of the magnetic circuit structure away from the diaphragm. The diaphragm may vibrate to cause the acoustic driver to radiate sound outward from the front side and the rear side of the acoustic driver. The acoustic output apparatus may further include a housing structure configured to carry the acoustic driver. One side of the front side and the rear side of the acoustic driver may form a cavity with the housing structure. The side of the acoustic driver forming the cavity may radiate the sound towards the cavity, and the other side of the acoustic driver may radiate the sound towards outside of the acoustic output apparatus.

18 Claims, 13 Drawing Sheets

(51) Int. Cl.
  *H04R 1/10* (2006.01)
  *H04R 1/22* (2006.01)
  *H04R 1/24* (2006.01)
  *H04R 1/28* (2006.01)
  *H04R 1/34* (2006.01)
  *H04R 1/40* (2006.01)
  *H04R 7/04* (2006.01)
  *H04R 7/18* (2006.01)
  *H04R 9/02* (2006.01)
  *H04R 9/06* (2006.01)

(52) U.S. Cl.
  CPC ......... *H04R 1/1075* (2013.01); *H04R 1/1091* (2013.01); *H04R 1/227* (2013.01); *H04R 1/24* (2013.01); *H04R 1/2846* (2013.01); *H04R 1/2884* (2013.01); *H04R 1/345* (2013.01); *H04R 7/04* (2013.01); *H04R 7/18* (2013.01); *H04R 9/025* (2013.01); *H04R 9/06* (2013.01)

(58) Field of Classification Search
  CPC ........ H04R 9/025; H04R 9/06; H04R 1/1091; H04R 1/227; H04R 1/24; H04R 1/2842; H04R 1/2846; H04R 1/2849; H04R 1/2884; H04R 1/347; H04R 1/40; H04R 1/403
  USPC ............................................................ 381/338
  See application file for complete search history.

(56) References Cited

U.S. PATENT DOCUMENTS

| | | |
|---|---|---|
| 7,499,555 B1 | 3/2009 | Isvan |
| 9,883,280 B2 | 1/2018 | Oosato et al. |
| 2017/0201822 A1 | 7/2017 | Shetye et al. |
| 2017/0208395 A1 | 7/2017 | Wan et al. |
| 2018/0167710 A1 | 6/2018 | Silver et al. |
| 2019/0020940 A1 | 1/2019 | Silver et al. |
| 2019/0132689 A1 | 5/2019 | Qi et al. |
| 2019/0238971 A1 | 8/2019 | Wakeland et al. |

FOREIGN PATENT DOCUMENTS

| | | | |
|---|---|---|---|
| CN | 103209377 A | 7/2013 | |
| CN | 103260117 A | 8/2013 | |
| CN | 203301726 U | 11/2013 | |
| CN | 205283805 U | 6/2016 | |
| JP | S55152765 U | 11/1980 | |
| JP | S58191598 A | 11/1983 | |
| JP | S58194499 A | 11/1983 | |
| JP | S5912685 A | 1/1984 | |
| JP | H2133090 U | 11/1990 | |
| JP | H0348997 U | 5/1991 | |
| JP | 2568675 Y2 | 4/1998 | |
| JP | 2000023285 A | 1/2000 | |
| JP | 2008135864 A | 6/2008 | |
| JP | 2011029960 A | 2/2011 | |
| JP | 2019145963 A | 8/2019 | |
| JP | 2019145965 A | 8/2019 | |
| KR | 20070045776 A | 5/2007 | |
| WO | WO-2005104611 A1 * | 11/2005 | .............. H04M 1/03 |
| WO | 2019145023 A1 | 8/2019 | |
| WO | 2019152478 A1 | 8/2019 | |

OTHER PUBLICATIONS

The Second Examination Report in Australian Application No. 2020350921 mailed on Mar. 2, 2023, 4 pages.
International Search Report in PCT/CN2020/106759 mailed on Oct. 28, 2020, 6 pages.
Written Opinion in PCT/CN2020/106759 mailed on Oct. 28, 2020, 6 pages.
Office Action in Russian Application No. 2022105654 mailed on Jan. 26, 2023, 12 pages.
Notice of Reasons for Rejection in Japanese Application No. 2022-517900 mailed on May 8, 2023, 13 pages.
Notice of Preliminary Rejection in Korean Application No. 10-2022-7012834 mailed on Jun. 20, 2023, 12 pages.
The Extended European Search Report in European Application No. 20864563.0 mailed on Aug. 29, 2022, 8 pages.
Notice of Final Rejection in Japanese Application No. 2022-517900 mailed on Nov. 13, 2023, 9 pages.
Communication Pursuant to Article 94(3) EPC in European Application No. 20864563.0 mailed on Apr. 17, 2024, 4 pages.

* cited by examiner (a)

(b)

(c)

(d)

ACOUSTIC OUTPUT APPARATUS

CROSS REFERENCE TO RELATED APPLICATIONS

This application is a Continuation of International Application No. PCT/CN2020/106759, filed on Aug. 4, 2020, and claims priority of Chinese Patent Application No. 201910888762.2, filed on Sep. 19, 2019, and Chinese Patent Application No. 201910888067.6, filed on Sep. 19, 2019, the entire contents of each of which are incorporated herein by reference.

TECHNICAL FIELD

The present disclosure relates to the field of acoustics, and in particular, to an acoustic output apparatus.

BACKGROUND

An open binaural acoustic output apparatus is a portable audio output device that achieves sound conduction within a specific range. Compared with traditional in-ear and over-ear headphones, the open binaural acoustic output apparatus has the characteristics of not blocking or covering the ear canal, thereby allowing users to obtain sound information from the external environment while listening to music and improving safety and comfort. Due to the use of an open structure, a sound leakage of the open binaural acoustic output apparatus may be more serious than that of conventional headphones. At present, a common practice in the industry is to place a loudspeaker in an acoustic cavity, and the front side and rear side of the acoustic cavity are respectively opened to form a dipole, so that a specific sound field with certain directivity is generated, and the sound pressure distribution may be adjusted to reduce the sound leakage in the far-field. Although the above manner may reduce the sound leakage to a certain extent, it still has certain limitations. For example, the acoustic output apparatus may have poor frequency response at mid-high frequency and low-frequency.

Therefore, it is desirable to provide an acoustic output apparatus that may simultaneously achieve the effects of increasing the user's listening volume and reducing sound leakage.

SUMMARY

An aspect of the present disclosure provides an acoustic output apparatus. The acoustic output apparatus may include an acoustic driver. The acoustic driver may include a diaphragm and a magnetic circuit structure. A front side of the acoustic driver may be formed at a side of the diaphragm away from the magnetic circuit structure. A rear side of the acoustic driver may be formed at a side of the magnetic circuit structure away from the diaphragm. The diaphragm may vibrate to cause the acoustic driver to radiate sound outward from the front side and the rear side of the acoustic driver. The acoustic driver may further include a housing structure configured to carry the acoustic driver. One side of the front side and the rear side of the acoustic driver may form a cavity with the housing structure. The side of the acoustic driver forming the cavity may radiate the sound towards the cavity, and the other side of the acoustic driver may radiate the sound towards outside of the acoustic output apparatus.

In some embodiments, the housing structure may include at least one sound guiding hole. The at least one sound guiding hole may be acoustically coupled with the cavity and guide the sound radiated to the cavity by the acoustic driver to the outside of the acoustic output apparatus.

In some embodiments, the at least one sound guiding hole may be arranged close to a center of a side of the housing structure facing the acoustic driver.

In some embodiments, a cross-sectional area of the at least one sound guiding hole may be not less than 0.25 mm$^2$.

In some embodiments, the at least one sound guiding hole may be configured with a sound damping structure.

In some embodiments, the magnetic circuit structure may include a magnetic conduction plate arranged opposite to the diaphragm. The magnetic conduction plate may include at least one sound guiding hole. The at least one sound guiding hole may guide the sound generated by the vibration of the diaphragm from the rear side of the acoustic driver to the outside of the acoustic output apparatus.

In some embodiments, the front side of the acoustic driver and the housing structure may form the cavity. The at least one sound guiding hole may guide the sound generated by the vibration of the diaphragm from the rear side of the acoustic driver to the outside of the acoustic output apparatus.

In some embodiments, a sound guiding tube may be arranged on the at least one sound guiding hole along a direction away from the diaphragm. The sound guiding tube may guide the sound radiated from the at least one sound guiding hole to the outside of the acoustic output apparatus.

In some embodiments, the at least one sound guiding hole may include a first hole portion and a second hole portion sequentially arranged from inside to outside. The first hole portion may penetrate through the second hole portion. A diameter of the second hole portion may be larger than a diameter of the first hole portion.

In some embodiments, a height of the cavity along a vibration direction of the diaphragm may be not greater than 3 mm.

In some embodiments, a shape of the diaphragm may be flat or approximately flat.

In some embodiments, the diaphragm may be fixed on the acoustic driver through a folding ring. The folding ring may be recessed along a direction away from the cavity.

In some embodiments, the rear side of the acoustic driver and the housing structure may form the cavity. The front side of the acoustic driver may be configured with a protection structure opposite to the diaphragm.

In some embodiments, the protection structure may be configured to separate the diaphragm from the outside and transmit the sound generated by the diaphragm to the outside.

In some embodiments, the protection structure may include a filter net structure.

In some embodiments, the protection structure may include a plate structure with at least one sound guiding hole.

In some embodiments, the cavity may guide the sound to the outside of the acoustic output apparatus via a first sound guiding hole. A side of the acoustic driver that does not form the cavity may guide the sound to the outside of the acoustic output apparatus through a second sound guiding hole. The first sound guiding hole and the second sound guiding hole may have different acoustic impedances.

In some embodiments, a sound path from one side of the front side and the rear side of the acoustic driver with a larger amplitude of high-frequency response to an ear may be less than a sound path from the other side of the front side and the rear side to the ear.

In some embodiments, one side of the front side and the rear side of the acoustic driver with a larger amplitude of high-frequency response may face an ear canal.

An aspect of the present disclosure provides an acoustic output apparatus. The acoustic output apparatus may include an acoustic driver. The acoustic driver may include a diaphragm and a magnetic circuit structure. A front side of the acoustic driver may be formed at a side of the diaphragm away from the magnetic circuit structure. A rear side of the acoustic driver may be formed at a side of the magnetic circuit structure away from the diaphragm. The diaphragm may vibrate to cause the acoustic driver to radiate sound outward directly from the front side and the rear side of the acoustic driver.

In some embodiments, the magnetic circuit structure may include a magnetic conduction plate arranged opposite to the diaphragm. The magnetic conduction plate may include at least one sound guiding hole. The at least one sound guiding hole may guide the sound generated by the vibration of the diaphragm from the rear side of the acoustic driver to the outside of the acoustic output apparatus.

In some embodiments, the front side of the acoustic driver may be configured with a protection structure opposite to the diaphragm. The protection structure may be connected with the magnetic circuit structure.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which the same reference numerals represent the same structures.

DETAILED DESCRIPTION

Figure 1:
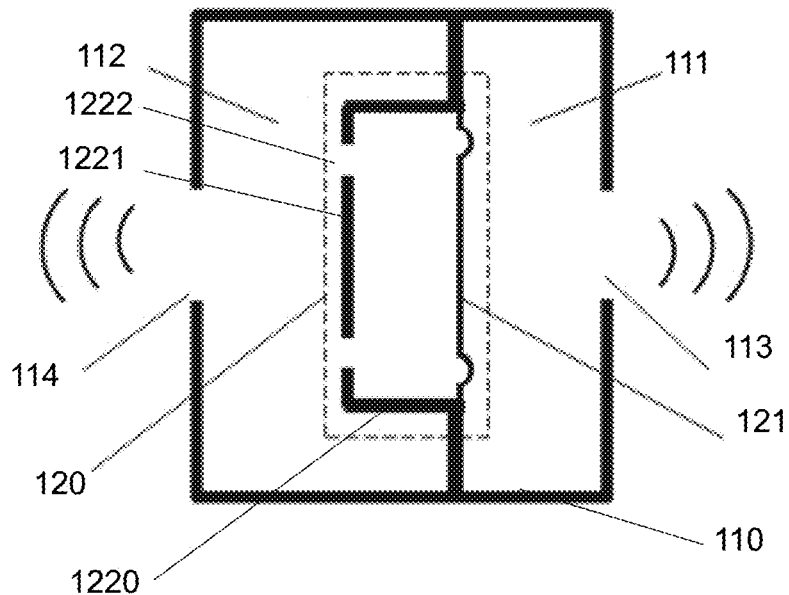
FIG. 1 is a schematic diagram illustrating an exemplary structure of an acoustic output apparatus according to some embodiments of the present disclosure.

In order to illustrate the technical solutions related to the embodiments of the present disclosure, brief introduction of the drawings referred to the description of the embodiments is provided below. Obviously, drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It will be understood that the term "system," "device," "unit," and/or "module" used herein are one method to distinguish different components, elements, parts, sections, or assembly of different levels in ascending order. However, if other words may achieve the same purpose, the words may be replaced by other expressions.

As used in the disclosure and the appended claims, the singular forms "a," "an," and "the" include plural referents unless the content clearly dictates otherwise. In general, the terms "comprises," "comprising," "includes," and/or "including" only indicate that the steps and units that have been clearly identified are included, the steps and units do not constitute an exclusive list, and the method or device may also include other steps or units.

The flowcharts used in the present disclosure illustrate operations that systems implement according to some embodiments of the present disclosure. It should be understood that a previous operation or a subsequent operation of the flowcharts may not be accurately implemented in order. Instead, each step may be processed in reverse or simultaneously. Moreover, other operations may also be added into these procedures, or one or more steps may be removed from these procedures.

FIG. 1 is a schematic diagram illustrating an exemplary structure of an acoustic output apparatus according to some embodiments of the present disclosure. As shown in FIG. 1, the acoustic output apparatus 100 may include a housing structure 110 that is hollow inside and an acoustic driver 120 arranged in the housing structure 110. The acoustic driver 120 may include a diaphragm 121 and a magnetic circuit structure 1220. The acoustic driver 120 may also include a voice coil (not shown). The voice coil may be fixed on a side of the diaphragm 121 facing the magnetic circuit structure 1220 and arranged in a magnetic field formed by the magnetic circuit structure 1220. When the voice coil is energized, the voice coil may vibrate under the action of the magnetic field and drive the diaphragm 121 to vibrate, thereby generating sound. For the convenience of description, a side (i.e., a right side of the diaphragm 121 shown in FIG. 1) of the diaphragm 121 away from the magnetic circuit structure 1220 may be designated as a front side of the acoustic driver 120, and a side (i.e., a left side of the magnetic circuit structure 1220 shown in FIG. 1) of the magnetic circuit structure 1220 away from the diaphragm 121 may be designated as a rear side of the acoustic driver 120. The diaphragm 121 may vibrate to cause the acoustic driver 120 to radiate sound outward from the front side and the rear side of the acoustic driver 120. As shown in FIG. 1, the front side of the acoustic driver 120 or the diaphragm 121 may form a first cavity 111 with the housing structure 110, and the rear side of the acoustic driver 120 may form a second cavity 112 with the housing structure 110. The front side of the acoustic driver 120 may radiates sound towards the first cavity 111, and the rear side of the acoustic driver 120 may radiate sound towards the second cavity 112. In some embodiments, the housing structure 110 may include a first sound guiding hole 113 and a second sound guiding hole 114. The first sound guiding hole 113 may be in communication with the first cavity 111, and the second sound guiding hole 113 may be in communication with the second cavity 112. The sound generated at the front side of the acoustic driver 120 may be transmitted to the outside through the first sound guiding hole 113, and the sound generated at the rear side of the acoustic driver 120 may be transmitted to the outside through the second sound guiding hole 114. In some embodiments, the magnetic circuit structure 1220 may include a magnetic conduction plate 1221 arranged opposite to the diaphragm. At least one sound guiding hole 1222 (also be referred to as a pressure relief hole) may be arranged on the magnetic conduction plate 1221, and used to guide the sound generated by the vibration of the diaphragm 121 from the rear side of the acoustic driver 120 to the outside through the second cavity 112. A dual-point sound source (or multi-point sound source) similar to a dipole structure may be formed by the sound radiation from the first sound guiding hole 113 and the second sound guiding hole 114 of the acoustic output device 100, so that a specific sound field with a certain directivity may be generated. It should be noted that the acoustic output apparatus in the embodiments of the present disclosure is not limited to the application of headphones, which may also be applied to other audio output devices (e.g., hearing aids, loudspeakers, etc.).

Figure 2:
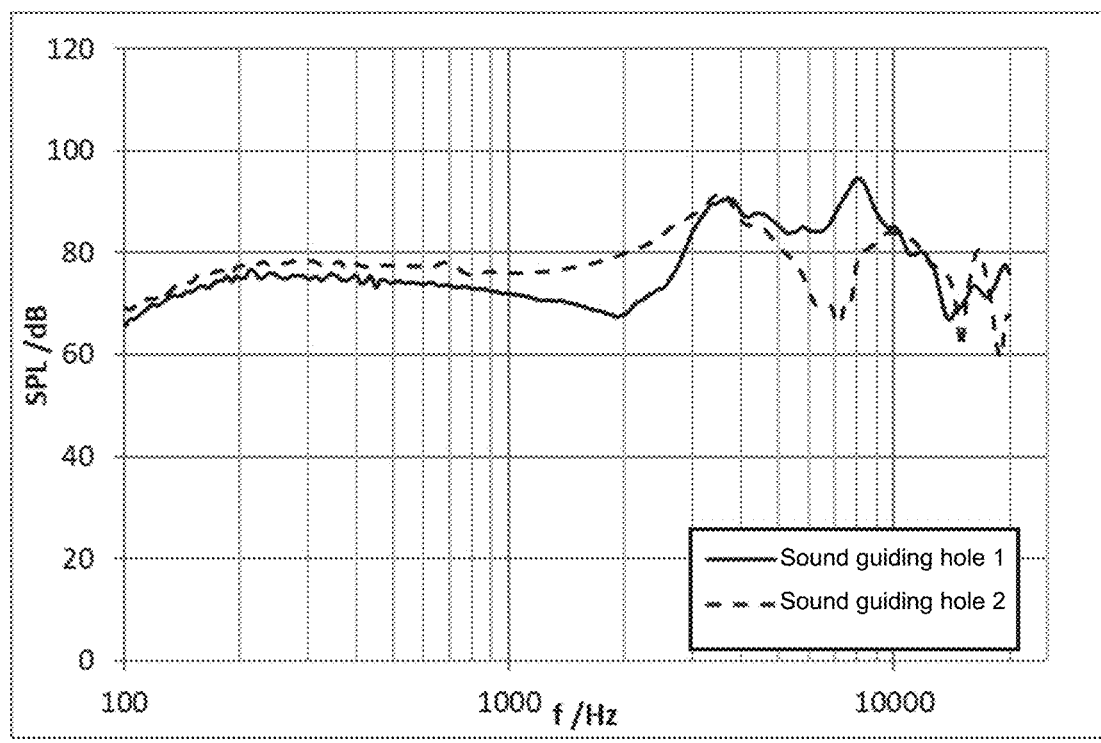
FIG. 2 is a schematic diagram illustrating frequency response curves of a first sound guiding hole and a second sound guiding hole of the acoustic output apparatus in FIG. 1.

FIG. 2 is a schematic diagram illustrating frequency response curves of a first sound guiding hole and a second sound guiding hole of the acoustic output apparatus in FIG. 1. As shown in FIG. 2, the first cavity 111 and the second cavity 112 arranged in the acoustic output apparatus 100 may cause the sound radiated from the first sound guiding hole 113 (a sound guiding hole 1 shown in FIG. 2) and the second sound guiding hole 114 (a sound guiding hole 2 shown in FIG. 2) of the acoustic output device 100 to generate a resonance peak at a middle frequency or a mid-high frequency (e.g., 2000 Hz-4000 Hz), respectively. Weakening degrees of the frequency responses after the resonance peak at the first sound guiding hole 113 and the second sound guiding hole 114 may be different (the frequency response at the second sound guiding hole 114 may decay faster), which may result in poor frequency response (e.g., sounds with a large difference in amplitude may be radiated from the two sound guiding holes) at higher frequencies of the structure similar to the dipole formed by the acoustic output apparatus 100. As a result, the sound leakage of the acoustic output apparatus 100 in the far-field may not be well suppressed. In addition, as shown in the curves in FIG. 2, an amplitude difference between the frequency responses of the first sound guiding hole 113 and the second sound guiding hole 114 at low frequencies (e.g., less than 500 Hz) may be small. Since phases of sounds radiated from the first sound guiding hole 113 and the second sound guiding hole 114 are opposite or approximately opposite, the low-frequency sound generated by the acoustic output apparatus 100 at a listening position (e.g., human auricle) may be attenuated due to the inverse phase cancellation of the sound, thereby resulting in the poor low-frequency response at the listening position.

In order to further improve the sound output effect of the acoustic output apparatus 100, the present disclosure provides another one or more acoustic output apparatuses each of which includes an acoustic driver. When a user wears the acoustic output apparatus, the acoustic output apparatus may be located at least on one side of the user's head, close to but not blocking the user's ear(s). The acoustic output apparatus may be worn on the head of the user (e.g., a non-in-ear open headset worn with glasses, a headband, or other structural means), or other body parts (e.g., a neck/shoulder region) of the user, or placed near the ears of the user by other manners (e.g., in the user's hand-held manner). The acoustic output apparatus may include an acoustic driver configured to generate sound and a housing structure configured to carry the acoustic driver. In some embodiments, one side of the front side and the rear side of the acoustic driver may form a cavity with the housing structure. The front side or the rear side of the acoustic driver may be arranged in or acoustically coupled to the cavity. The side (if any) of the acoustic driver forming the cavity may radiate the sound towards the cavity. The sound may be transmitted to the outside via the sound guiding hole of the housing structure. The other side of the acoustic driver may radiate the sound towards directly the outside of the acoustic output apparatus. In some embodiments, neither the front side nor the rear side of the acoustic driver may form a cavity with the housing structure. The front side and the rear side of the acoustic driver may radiate sound towards directly the outside without passing through the cavity. It should be understood that the manner mentioned above may effectively reduce a count of cavities formed by the housing structure on two sides of the acoustic driver. In such cases, on the one hand, a size of the acoustic output apparatus may be effectively reduced, on the other hand, the influence of increasing the count of cavities on the frequency characteristics of the sound output by the acoustic output apparatus may be avoided.

In some embodiments, the housing structure of the acoustic output apparatus may be used as a baffle to separate the front side and the rear side of the acoustic driver. On the one hand, the baffle may increase a sound path difference (i.e., a path difference between the sound radiated from the front side of the acoustic driver to the user's ear canal and the sound radiated from the rear side of the acoustic driver to the user's ear canal) between a sound path from the front side of the acoustic driver to transmit sound to the user's ear and a sound path from the rear side of the acoustic driver to transmit the sound to the user's ear, which may weaken the sound cancellation effect, thereby increasing the volume of sound (also be referred to as sound in the near-field) heard by the user's ear(s) to provide a better hearing experience for the user. On the other hand, the baffle has little effect on sound (also be referred to as sound in the far-field) transmitted to the environment from the front side and the rear side of the acoustic driver. The sound radiated from the front side of the acoustic driver and the sound radiated from the rear side of the acoustic driver may still be canceled with each other in the far-field, thereby suppressing the sound leakage of the acoustic output apparatus to a certain extent. As a result, the sound generated by the acoustic output apparatus may be prevented from being heard by others near the user.

Merely for the purpose of description and illustration, when the sizes of the sound guiding holes on the acoustic output apparatus are small, each sound guiding hole may be approximately designated as a point sound source. A sound pressure of a sound field generated by a single-point sound source may be represented by Equation (1) below:

$$p = \frac{j\omega\rho_0}{4\pi r} Q_0 \exp j(\omega t - kr), \quad (1)$$

where $\omega$ refers to an angular frequency, $\rho_0$ refers to an air density, r refers to a distance between a target point and the single-point sound source, $Q_0$ refers to a volume velocity of the single-point sound source, and k refers to a wave number. The sound pressure of the sound field of the single-point sound source may be inversely proportional to the distance between the target point and the single-point sound source.

As described above, the sound (i.e., the sound leakage in the far-field) radiated by the acoustic output apparatus to the surrounding environment may be reduced by arranging two sound guiding holes on the acoustic output apparatus to form a dual-point sound source. In some embodiments, the sounds output via the two sound guiding holes, that is, the dual-point sound source may have a certain phase difference. When positions, phase difference, or the like, of the dual-point sound source satisfy a certain condition, the acoustic output apparatus may represent different sound effects in the near-field and the far-field. For example, when phases of the point sound sources corresponding to the two sound guiding holes are opposite, that is, an absolute value of a phase difference between the two point sound sources is 180°, the sound leakage in the far-field may be reduced according to the principle of inverse phase cancellation of sound wave.

Figure 3:
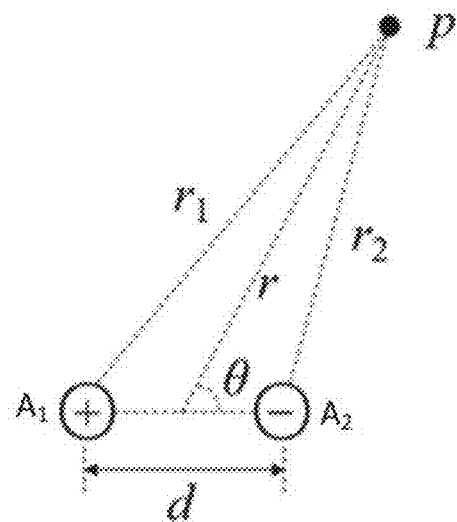
FIG. 3 is a schematic diagram illustrating a dual-point sound source according to some embodiments of the present disclosure.

As shown in FIG. 3, a sound pressure p of a sound field generated by a dual-point sound source may be represented by the following equation:

$$p = \frac{A_1}{r_1} \exp j(\omega t - kr_1 + \varphi_1) + \frac{A_2}{r_2} \exp j(\omega t - kr_2 + \varphi_2), \quad (2)$$

where $A_1$ and $A_2$ refer to intensities of two point sound sources of the dual-point sound source, respectively, $\varphi_1$ and $\varphi_2$ refer to phases of the two point sound sources of the dual-point sound source, respectively, d refers to a distance between the two point sound shources, and $r_1$ and $r_2$ may be represented by Equation (3) below:

$$\begin{cases} r_1 = \sqrt{r^2 + \left(\frac{d}{2}\right)^2 - 2*r*\frac{d}{2}*\cos\theta} \\ r_2 = \sqrt{r^2 + \left(\frac{d}{2}\right)^2 + 2*r*\frac{d}{2}*\cos\theta} \end{cases}, \quad (3)$$

where r refers to a distance between any target point in the space and a center of the dual-point sound source, and $\theta$ refers to an angle between a line connecting the target point and the center of the dual-point sound source and a line on which the dual-point sound source may be located.

According to Equation (3), the sound pressure p of the target point in the sound field may relate to an intensity of each point sound source, the distance d, a phase of each point sound source, and a distance between the target point and the dual-point sound source.

Figure 4:
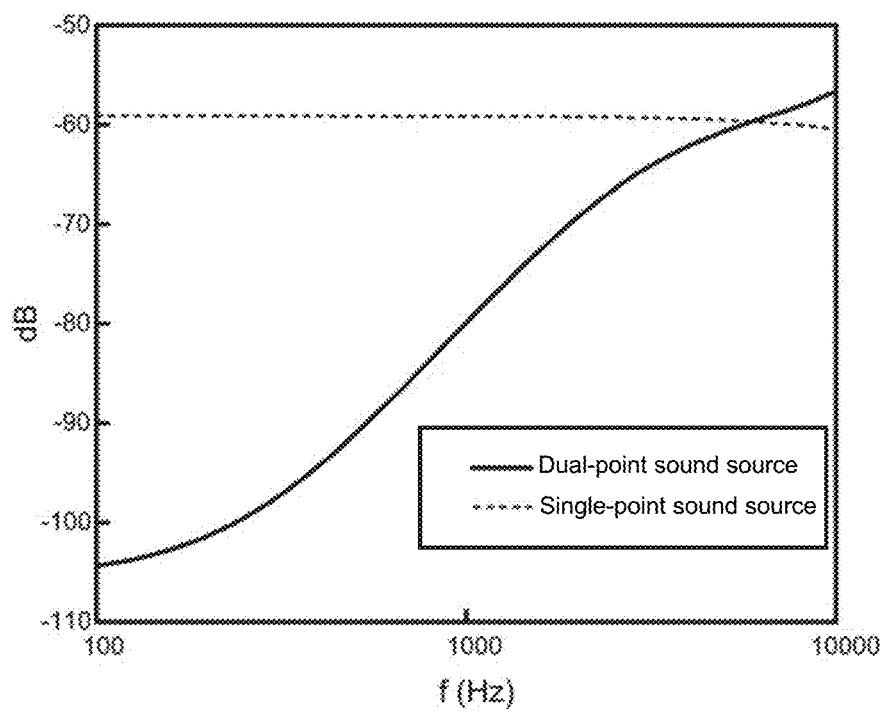
FIG. 4 is a schematic diagram illustrating sound leakages in a far-field of a single-point sound source and a dual-point sound source according to some embodiments of the present disclosure.

FIG. 4 is a schematic diagram illustrating sound leakages in a far-field of a single-point sound source and a dual-point sound source according to some embodiments of the present disclosure. As shown in FIG. 4, in the far-field, when a distance between a dual-point sound source is constant, in a certain frequency range (e.g., 100 Hz-8000 Hz), a leakage volume generated by the dual-point sound source may be smaller than that of the single-point sound source. That is, in the certain frequency range, the capability of sound leakage reduction of the dual-point sound source may be higher than that of the single-point sound source. It should be noted that the sound source in this embodiment may use a point sound source as an example, and a type of the sound source is not limited. In other embodiments, the sound source may also be a surface sound source.

Figure 5:
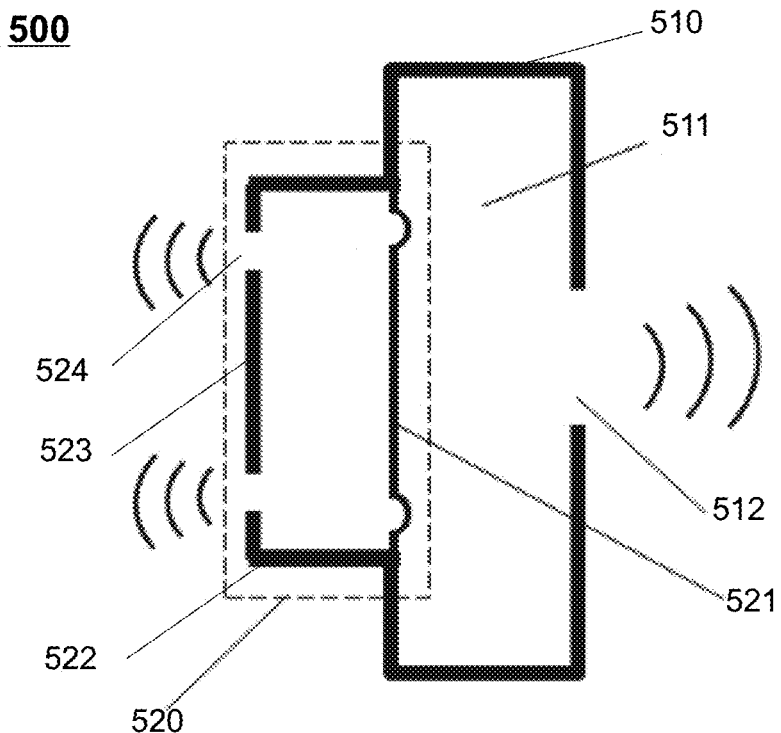
FIG. 5 is a schematic diagram illustrating a structure of an acoustic output apparatus according to some embodiments of the present disclosure.

FIG. 5 is a schematic diagram illustrating a structure of an acoustic output apparatus according to some embodiments of the present disclosure. As shown in FIG. 5, the acoustic output apparatus 500 may include a housing structure 510 and an acoustic driver 520 connected to the housing structure 510.

In some embodiments, the housing structure 510 may be worn on the user's body and carry one or more acoustic drivers 520. In some embodiments, the housing structure 510 may be a closed housing structure that is hollow inside, and the one or more acoustic drivers 520 may be fixedly connected to the housing structure 510.

In some embodiments, the acoustic output apparatus 500 may be worn on the user's body (e.g., head, neck, or upper torso of the human body) through the housing structure 510. The housing structure 510 and the acoustic driver 520 may be close to but not block the ear canal, so that the user's ear(s) may keep open. As a result, the user may not only hear the sound output by the acoustic output apparatus 500 but also obtain the sound of the external environment. For example, the acoustic output apparatus 500 may be arranged around or partially around the circumference of the user's ear(s). In some embodiments, the acoustic output apparatus 500 may be combined with products such as glasses, headphones, head-mounted display devices, AR/VR helmets, or the like. In such cases, the housing structure 510 may be fixed in the vicinity of the user's ear(s) by ways of hanging or clamping. In some alternative embodiments, the housing structure 510 may be configured with a hook. A shape of the hook may match a shape of the auricle, so that the acoustic output apparatus 500 may be independently worn on the user's ear(s) via the hook. The independently worn acoustic output apparatus 500 may be connected to a signal source (e.g., a computer, a mobile phone, or other mobile devices) in a wired or wireless (e.g., Bluetooth) manner. For example, the acoustic output apparatuses 500 at the left ear and right ear may both be in direct communication with the signal source in a wireless manner. As another example, the acoustic output apparatuses 500 at the left ear and right ear may include a first output apparatus and a second output apparatus. The first output apparatus may be in communication with the signal source, and the second output apparatus may be connected to the first output apparatus in the wireless manner. The audio playback of the first output apparatus and the second output apparatus may be synchronized via one or more synchronization signals. The wireless manner may include but is not limited to, Bluetooth, a local area network, a wide area network, a wireless personal area network, a near field communication, or the like, or any combination thereof.

In some embodiments, the housing structure 510 may have a shape adapted to a human ear, for example, circular, oval, polygonal (regular or irregular), U-shaped, V-shaped, semi-circular, so that the housing structure 510 may be directly attached to the user's ear. In some embodiments, the housing structure 510 may also include one or more fixed structures. The fixed structure may include an ear hook, a head beam, or an elastic band, so that the acoustic output apparatus 500 may be better fixed on the user's body, thereby preventing the acoustic output apparatus 500 from falling during usage. Merely by way of example, the elastic band may be a headband to be worn around the head area. As another example, the elastic band may be a neckband to be worn around the neck/shoulder area. In some embodiments, the elastic band may be a continuous band and elastically stretched to fit on the user's head. The elastic band may also exert pressure on the user's head, so that the acoustic output apparatus 500 may be firmly fixed on a specific position of the user's head. In some embodiments, the elastic band may be a discontinuous band. For example, the elastic band may include a rigid portion and a flexible portion. The rigid portion may be made of rigid material (e.g., plastic or metal). The rigid portion may be fixed with the housing structure 510 of the acoustic output apparatus 500 by ways of physical connection (e.g., a snap connection, a screw connection, etc.). The flexible portion may be made of elastic material (e.g., cloth, composite, or/and neoprene).

The acoustic driver 520 may be a component that may receive an electrical signal and convert the electrical signal into a sound signal for output. In some embodiments, differentiated by frequency, the acoustic driver 120 may include a low-frequency (e.g., less than 3 kHz) acoustic driver, a mid-high frequency (e.g., 3 kHz-7 kHz) acoustic driver, a high-frequency (e.g., greater than 7 kHz) acoustic driver, or any combination thereof. Certainly, as used herein, the low frequency, high frequency, or the like, may only refer to a rough range of frequencies. Different frequency dividing manners may be applied in different application scenarios. For example, a frequency division point may be determined. A frequency range below the frequency division point may be the low frequency, and a frequency range above the frequency division point may be the high frequency. The frequency division point may be any value within an audible frequency range of the human ear, for example, 500 Hz, 600 Hz, 700 Hz, 800 Hz, 1000 Hz, or the like. In some embodiments, differentiated by the principle, the acoustic driver 520 may include, but is not limited to, a moving coil acoustic driver, a moving iron acoustic driver, a piezoelectric acoustic driver, an electrostatic acoustic driver, a magnetostrictive acoustic driver, or the like.

The acoustic driver 520 may include a diaphragm 521 and a magnetic circuit structure 522. The diaphragm 521 and the magnetic circuit structure 522 may be arranged in sequence along a vibration direction of the diaphragm 521. In some embodiments, the diaphragm 521 may be mounted on a frame (not shown), and the frame may be fixed on the magnetic circuit structure 522. Alternatively, the diaphragm 521 may be directly and fixedly connected to a sidewall of the magnetic circuit structure 522. A front side of the acoustic driver 520 may be formed at a side of the diaphragm 521 away from the magnetic circuit structure 522, and a rear side of the acoustic driver 520 may be formed at a side of the magnetic circuit structure 522 away from the diaphragm 521. The diaphragm 521 may vibrate to cause the acoustic driver 520 to radiate sound outward from the front side and the rear side of the acoustic driver 520.

The front side of the acoustic driver 520 may form a cavity 511 with the housing structure 510. The front side of the acoustic driver 520 may radiate sound towards the cavity 511, and the rear side of the acoustic driver 520 may radiate sound towards the outside of the acoustic output apparatus 500. In some embodiments, one or more sound guiding holes 512 may be arranged on the housing structure 510. A sound guiding hole 512 may be acoustically coupled with the cavity 511 and guide the sound radiated to the cavity 511 by the acoustic driver 520 to the outside of the acoustic output apparatus 500. In some embodiments, the magnetic circuit structure 522 may include a magnetic conduction plate 523 arranged opposite to the diaphragm 521. The magnetic conduction plate 523 may be provided with one or more sound guiding holes 524 (also be referred to as pressure relief holes). A sound guiding hole 524 may guide the sound generated by the vibration of the diaphragm 521 from the rear side of the acoustic driver 520 to the outside of the acoustic output apparatus 500. Since the sound guiding hole 512 and the sound guiding hole 524 are arranged on two sides of the diaphragm 521, respectively, the phases of the sounds derived from the sound guiding hole 512 and the sound guiding hole 524 may be considered to be opposite or approximately opposite. Therefore, the sound guiding hole 512 and the sound guiding hole 524 may constitute the dual-point sound source as shown in FIG. 3.

In some embodiments, the diaphragm 521 may be embedded in a sidewall of the housing structure 510. For example, a mounting hole (not shown) may be arranged on the sidewall of the housing structure 510. An end of the diaphragm 521 may be fixed at the mounting hole, so that the acoustic coupling between the front side of the acoustic driver 520 or the diaphragm 521 and the cavity 511 of the housing structure 510 may be realized. In some embodiments, a side of the acoustic driver 520 with the diaphragm 521 may be accommodated in the housing structure 510, and a peripheral portion of the magnetic circuit structure 522 of the acoustic driver 520 may be connected to the sidewall of the housing structure 510, so that the diaphragm 521 may be arranged in the housing structure 510 and form the cavity 511 with the housing structure 510.

Figure 6:
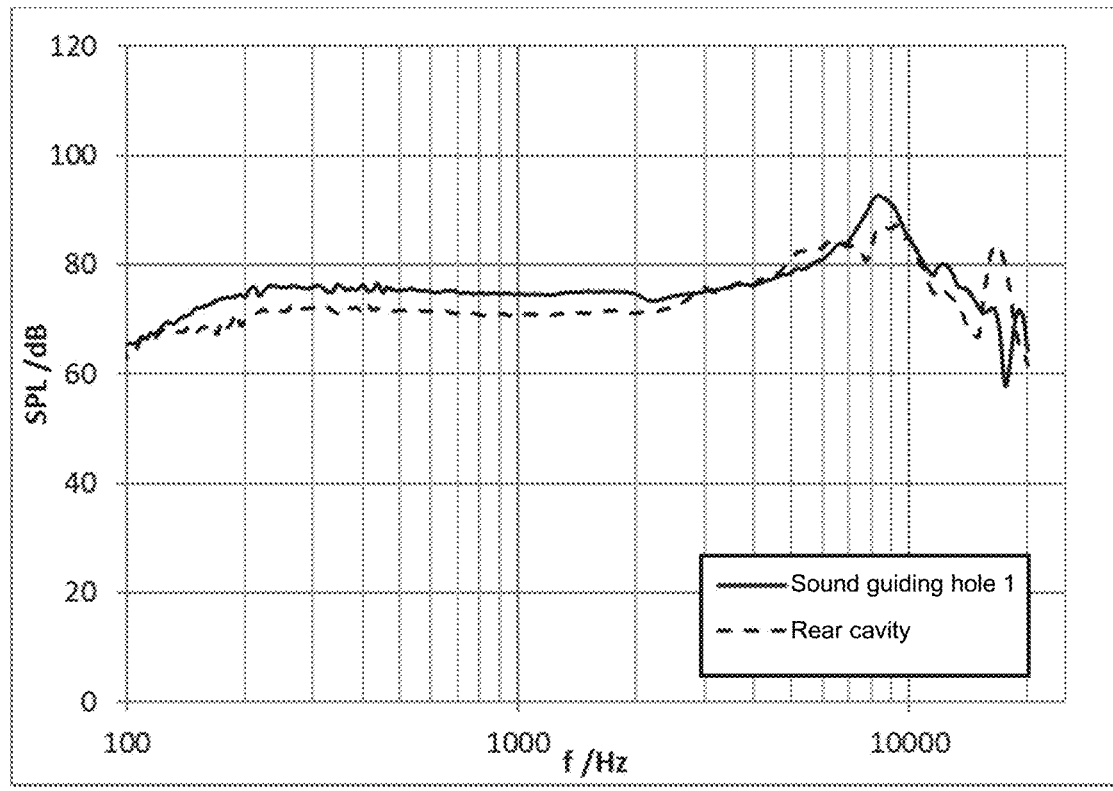
FIG. 6 is a schematic diagram illustrating frequency response curves of a front side and rear side of an acoustic output apparatus according to some embodiments of the present disclosure.

FIG. 6 is a schematic diagram illustrating frequency response curves of a front side and rear side of the acoustic output apparatus 500 in FIG. 5. As shown in FIG. 6, sound (a curve corresponding to "rear cavity" in FIG. 6) generated at the rear side of the acoustic driver 520 is directly transmitted to the outside via the sound guiding hole 524, which is different from a process in which sound (a curve corresponding to "sound guiding hole 1" in FIG. 6) generated at the front side of the acoustic driver 520 needs to pass through the cavity 511 and be transmitted to the outside via the sound guiding hole 512, so that a resonance peak of the sound generated by the acoustic output apparatus 500 at the sound guiding hole 524 may be located at a higher frequency (e.g., 7 kHz-8 kHz). In such cases, the frequency response curve before the resonance peak may be relatively flat in a larger frequency range, thereby improving the sound output effect of the acoustic output apparatus 500 at a high frequency. In combination with FIG. 1, FIG. 2, FIG. 5, and FIG. 6, FIG. 2 shows the frequency response curves of the acoustic output apparatus 100 in FIG. 1, FIG. 6 shows the frequency response curves of the acoustic output apparatus 500 in FIG. 5, and the acoustic output apparatus 500 shown in FIG. 5 has one less cavity (e.g., the second cavity 112) than the acoustic output apparatus 100 shown in FIG. 1. Compared with the sound generated by the diaphragm 121 of the acoustic output apparatus 100, the sound generated by the diaphragm 521 of the acoustic output apparatus 500 is not coupled with the cavity on the rear side of the acoustic driver 520, so that the resonance peaks of the frequency response curves at high frequency corresponding to the sound guiding hole 524 and the sound guiding hole 512 of the acoustic output apparatus 500 may be located at higher frequencies (e.g., 7 kHz-8 kHz). In addition, the frequency responses corresponding to the sound guiding hole 524 and the sound guiding hole 512 may be more consistent at the high frequency. That is, at the high frequency, phases of the sounds at the sound guiding hole 524 and the sound guiding hole 512 may be opposite, and amplitudes of the sounds at the sound guiding hole 524 and the sound guiding hole 512 may be more consistent. In the far-field, the sounds from the front side and the rear side of the acoustic driver 520 may cancel each other out. In combination with the description mentioned above, at the high frequency, the sound leakage reduction effect of the acoustic output apparatus 500 relative to the acoustic output apparatus 100 may be better. Further, the frequency response curve before the resonance peak may be relatively flat in a larger frequency range, so that the listening quality of the acoustic output apparatus 500 at the high frequency may be better. In addition, based on the structure of the acoustic output apparatus 500, the frequency responses of the acoustic driver 520 at the sound guiding hole 512 and the sound guiding hole 524 may be very close at a mid-high frequency range (e.g., 3 kHz-7 kHz). That is, the frequency response corresponding to the front side of the acoustic driver 520 and the frequency response corresponding to the rear side of the acoustic driver 520 may be very close at the mid-high frequency range. Therefore, the phases of the sounds radiated from the front side and the rear side of the acoustic driver 520 may be opposite or approximately opposite. In the far-field, the sounds radiated from the front side and the rear side of the acoustic driver 520 may cancel each other out, so that the sound leakage of the acoustic output apparatus 500 at the mid-high frequency range may be significantly reduced.

At a low frequency range (e.g., less than 3 kHz), an amplitude of the frequency response (the curve corresponding to the "sound guiding hole 1" in FIG. 6) corresponding to the sound guiding hole 512 may be greater than an amplitude of the frequency response (the curve corresponding to the "rear cavity" in FIG. 6) corresponding to the sound guiding hole 524. Therefore, in the near-field, the amplitude of the sound radiated from the sound guiding hole 512 to the user's ear(s) may be greater than the amplitude of the sound radiated from the sound guiding hole 524 to the user's ear(s). The effect of the inverse phase cancellation of the sound may be weak, which increases a listening volume of the listening position (i.e., the user's ear(s)) at the low frequency. Alternatively, when the sound guiding hole 512 faces or is closer to the user's ear(s), a difference between the amplitude of the sound radiated from the sound guiding hole 512 to the user's ear(s) and the amplitude of the sound radiated from the sound guiding hole 524 to the user's ear(s) may further be increased, and the effect of the inverse phase cancellation of the sound may be further weakened. Therefore, the listening volume of the listening position at the low-frequency may be louder. In the far-field, since the human ear is not sensitive to low frequency, although the amplitudes of the sounds radiated from the sound guiding hole 512 and the sound guiding hole 524 are different, the sound leakage perceived by the human ear may not increase significantly.

At a high frequency range (greater than 7 kHz), the amplitude of the frequency response corresponding to the sound guiding hole 512 may be significantly larger than the amplitude of the frequency response corresponding to the sound guiding hole 524. The acoustic output apparatus 500 may have strong directivity at the high frequency. Therefore, the directivity of the sound at the high frequency may be used to achieve the effect of increasing the listening volume in the near-field and reducing the sound leakage volume in the far-field. A wavelength of the sound at the high frequency may be shorter than that of the middle frequency and the low frequency, so that the sound at the high frequency may have strong directivity, which indicates that a volume in the direction in which the high-frequency sound directs may be louder, and volumes in other directions may be lower. For example, when the user wears the acoustic output apparatus 500, the sound guiding hole 512 may be close to the ear canal, and the sound guiding hole 524 may be away from the ear canal. At the high frequency, since the sound at the sound guiding hole 524 does not direct toward the ear canal, by suppressing the high-frequency sound radiated from the sound guiding hole 524, the frequency response at the high frequency of the sound guiding hole 524 may be as low as possible. When the high-frequency sound generated at the sound guiding hole 512 directs toward the ear(s), the high-frequency sound heard by the ear(s) may be relatively loud, and the sound in other directions may be relatively small (i.e., a sound leakage volume of the sound guiding hole 524 may be small). Therefore, the amplitude of the frequency response corresponding to the sound guiding hole 512 may be significantly larger than the amplitude of the frequency response corresponding to the sound guiding hole 524, so that the listening volume of the acoustic output apparatus 500 in the near-field may be increased and the sound leakage volume of the acoustic output apparatus 500 in the far-field may be reduced. It should be noted that the frequency response corresponding to the sound guiding hole 512 in the embodiments mentioned above may be regarded as the frequency response corresponding to the front side of the acoustic driver 520, and the frequency response corresponding to the sound guiding hole 524 may be regarded as the frequency response corresponding to the rear side of the acoustic driver 520.

Figure 7:
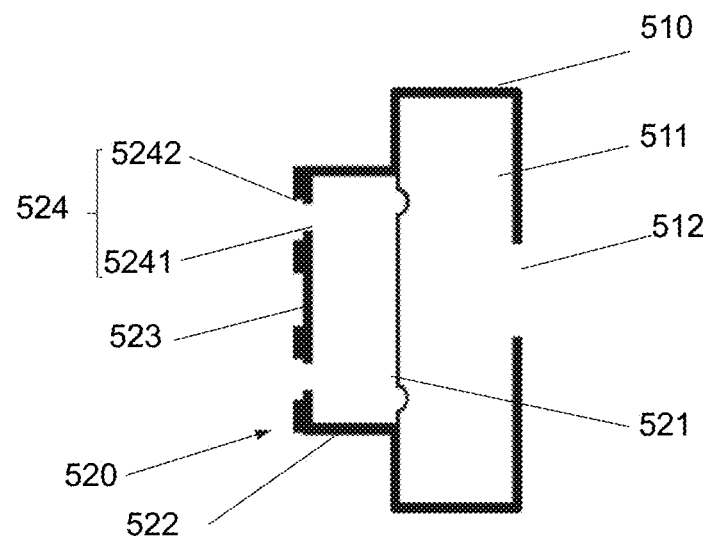
FIG. 7 is a schematic diagram illustrating a structure of an acoustic output apparatus according to some embodiments of the present disclosure.

FIG. 7 is a schematic diagram illustrating a structure of an acoustic output apparatus according to some embodiments of the present disclosure. As shown in FIG. 7, in some embodiments, the sound guiding hole 524 may include a first hole portion 5241 and a second hole portion 5242 sequentially arranged from inside to outside. The first hole portion 5241 may penetrate through the second hole portion 5242. A diameter of the second hole portion 5242 may be larger than a diameter of the first hole portion 5241. For example, when both the first hole portion 5241 and the second hole portion 5242 are circular, the diameter of the second hole portion 5242 may be larger or smaller than the diameter of the first hole portion 5241. It should be noted that shapes of the first hole portion 5241 and the second hole portion 5242 of the sound guiding hole 524 described above are not limited to circular. The shapes may also include a semicircle, a quarter circle, an ellipse, a semi ellipse, a polygon, or the like, which are not further limited herein.

It should be noted that the arrangement of the first hole portion 5241 and the second hole portion 5242 at the position of the sound guiding hole 524 may adjust the frequency response of the sound (i.e., the sound radiated to the outside from the sound guiding hole 524) radiated from the rear side of the acoustic driver 520. In some alternative embodiments, the sound guiding hole 524 may be a hole whose cross-sectional area gradually increases or decreases from the inside to the outside. In some embodiments, a plurality of sound guiding holes 524 may be arranged on the rear side of the acoustic driver 520. Different sound guiding holes 524 may have the same or different structural settings.

Figure 8:
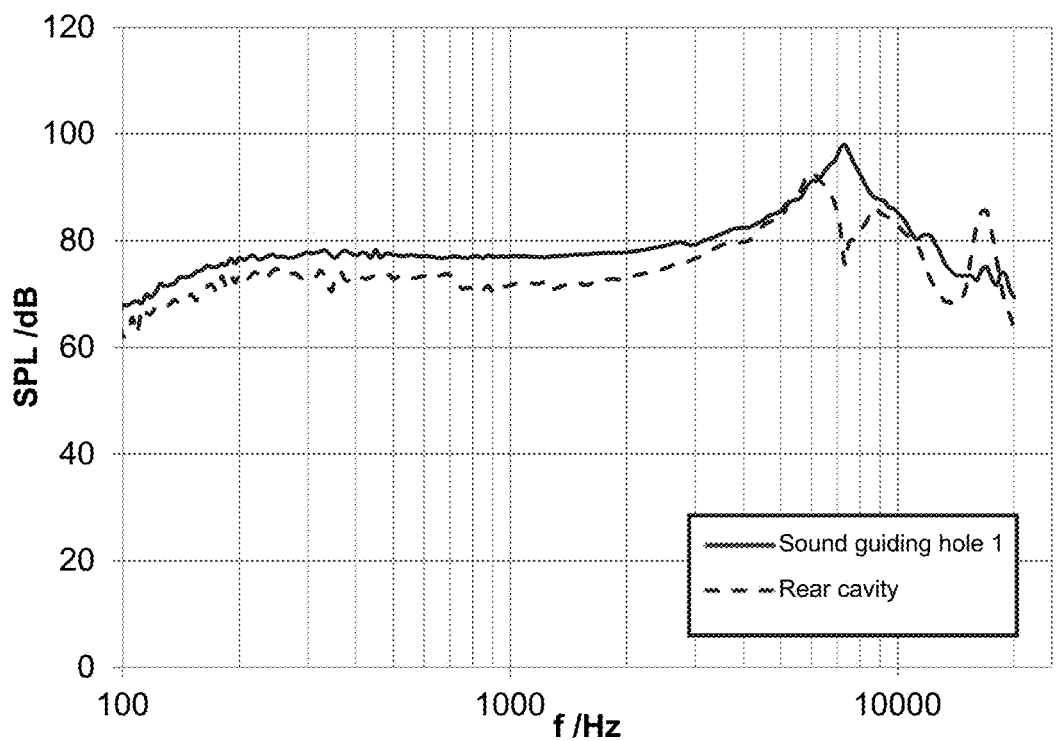
FIG. 8 is a schematic diagram illustrating frequency response curves of a front side and rear side of an acoustic output apparatus according to some embodiments of the present disclosure.

FIG. 8 is a schematic diagram illustrating frequency response curves of a front side and a rear side of the acoustic output apparatus in FIG. 7. As shown in FIG. 8, in the mid-high frequency range (e.g., 5 kHz-6 kHz), a frequency response (a curve corresponding to "sound guiding hole 1" in FIG. 8) at the sound guiding hole 512 and frequency response (a curve corresponding to "rear cavity" in FIG. 8) at the sound guiding hole 524 may be very close. Therefore, the sound guiding hole 512 and the sound guiding hole 524 may be designated as a dual-point sound source with the same amplitude. Since phases of the sound radiated from the sound guiding hole 524 and phases of the sound radiated from the sound guiding hole 524 may be opposite, the sound leakage of the acoustic output apparatus in the far-field in the mid-high frequency range may be significantly reduced. In the high-frequency range (e.g., 7 kHz-9 kHz), since the amplitude of the frequency response at the sound guiding hole 512 is greater than the amplitude of the frequency response at the sound guiding hole 524, the directivity of the sound in the high-frequency range may be used to increase the listening volume in the near-field and reduce the sound leakage volume in the far-field.

In some embodiments, the frequency responses of the sound guiding hole 512 and the sound guiding hole 524 may be adjusted by adjusting a structure, a size, a shape, a position, or the like, of the sound guiding hole 524 and/or the sound guiding hole 512, thereby improving the acoustic output effect of the acoustic output apparatus. When the sizes or positions of the sound guiding hole 512 and the sound guiding hole 524 are changed, the changes of the frequency responses at the sound guiding hole 512 and the sound guiding hole 524 may be referred to FIG. 12, FIG. 17, FIG. 18, and related description.

Figure 9:
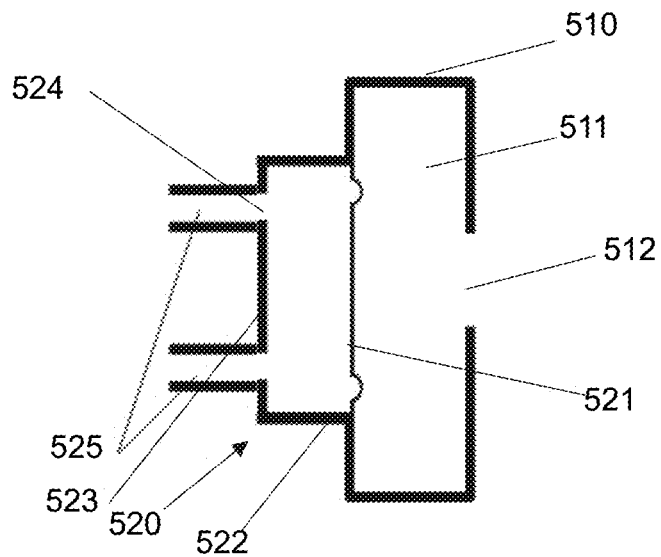
FIG. 9 is a schematic diagram illustrating a structure of an acoustic output apparatus according to some embodiments of the present disclosure.

In some embodiments, as shown in FIG. 9, a sound guiding tube 525 may be arranged at the sound guiding hole 524. The sound guiding tube 525 may be arranged along a direction away from the diaphragm. That is, the sound guiding tube 525 may extend from the sound guiding hole 524 to the outside of the acoustic output apparatus. The sound guiding tube 525 may guide the sound radiated from the sound guiding hole 524 to the outside of the acoustic output apparatus. In some embodiments, the sound guiding tube 525 at the sound guiding hole 524 may adjust the frequency response of the sound (i.e., the sound radiated from the sound guiding hole 524 to the outside) radiated outward from the rear side of the acoustic driver 520. For example, the corresponding frequency response of the sound guiding tube 525 may be adjusted by adjusting a diameter or a cross-sectional area of the sound guiding tube. In some embodiments, the sound guiding tube 525 may be a straight tube or have a structure with an increasing cross-sectional area along a direction away from the diaphragm 521.

Figure 10:
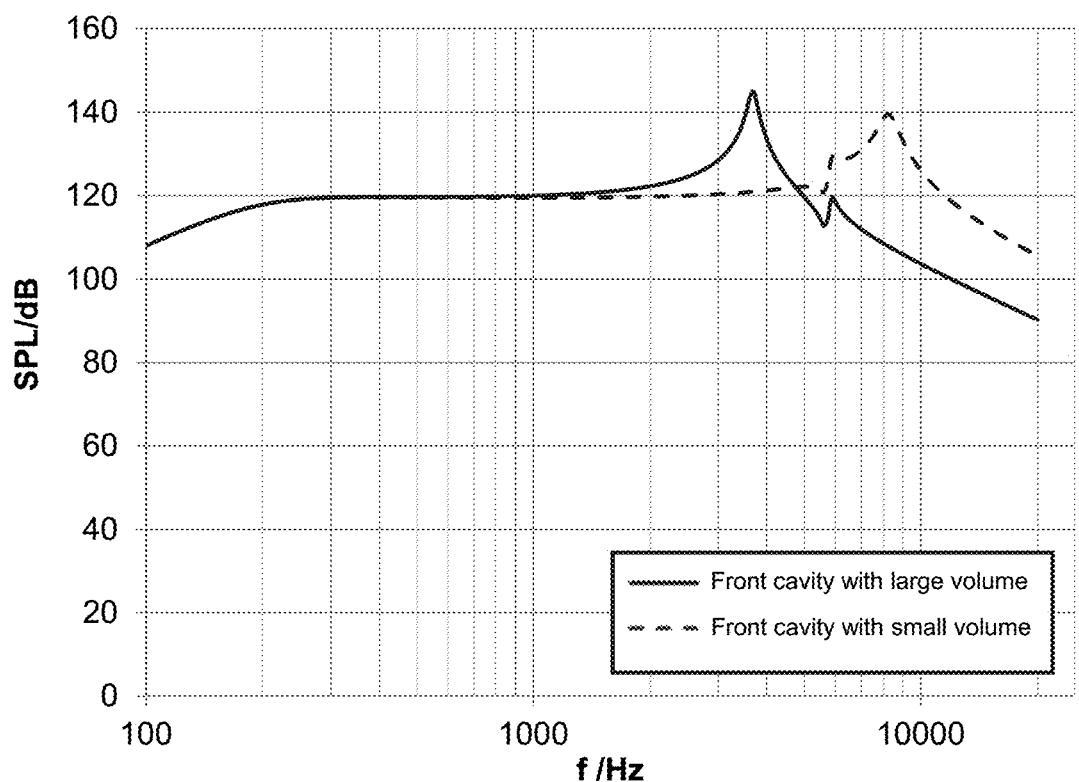
FIG. 10 is a schematic diagram illustrating frequency response curves of acoustic output apparatuses with different cavity volumes according to some embodiments of the present disclosure.

FIG. 10 is a schematic diagram illustrating frequency response curves of the acoustic output apparatus in FIG. 9 with different cavity volumes. In some embodiments, the acoustic output effect of the acoustic output apparatus at the high frequency may be improved by adjusting a volume of the cavity 511. As shown in FIG. 9 and FIG. 10, the smaller the volume of the cavity 511 (a "front cavity" in FIG. 10) may be, the later a frequency position of the resonance peak in the frequency response of the sound guiding hole 512 may be. For the convenience of description, in the embodiments of the present disclosure, the cavity volume may be approximately considered to be proportional to a product of an area of the diaphragm and an effective height h of the cavity. The effective height h may refer to the height of the cavity 511 along the vibration direction of the diaphragm 521. In some embodiments, the effective height h of the cavity may not be greater than 3 mm. In some embodiments, the effective height h of the cavity may not be greater than 2 mm. In some embodiments, the effective height h of the cavity may not be greater than 1 mm. In some embodiments, the effective height h of the cavity may not be greater than 0.5 mm. In some embodiments, the effective height h of the cavity may not be greater than 0.4 mm. In some embodiments, by setting the volume of the cavity 511, the frequency of the resonance peak in the frequency response of the sound guiding hole 512 may not be less than 3 kHz. In some embodiments, by setting the volume of the cavity 511, the frequency of the resonance peak in the frequency response of the sound guiding hole 512 may not be less than 5 kHz. In some embodiments, by setting the volume of the cavity

511, the frequency of the resonance peak in the frequency response of the sound guiding hole 512 may not be less than 7 kHz.

A shape of the diaphragm may affect the volume of the cavity. Since the diaphragm of the acoustic driver has a certain vibration amplitude when vibrating, it is necessary to reserve a certain vibration space for the diaphragm while ensuring a small volume of the cavity to prevent the diaphragm from colliding with the housing structure when the diaphragm vibrates, which may cause cracking voice. Therefore, a gap between a top (i.e., an end surface of the diaphragm facing the cavity) of the diaphragm and an inner wall of the cavity facing the diaphragm may be larger than a vibration amplitude of the diaphragm.

Figure 11:
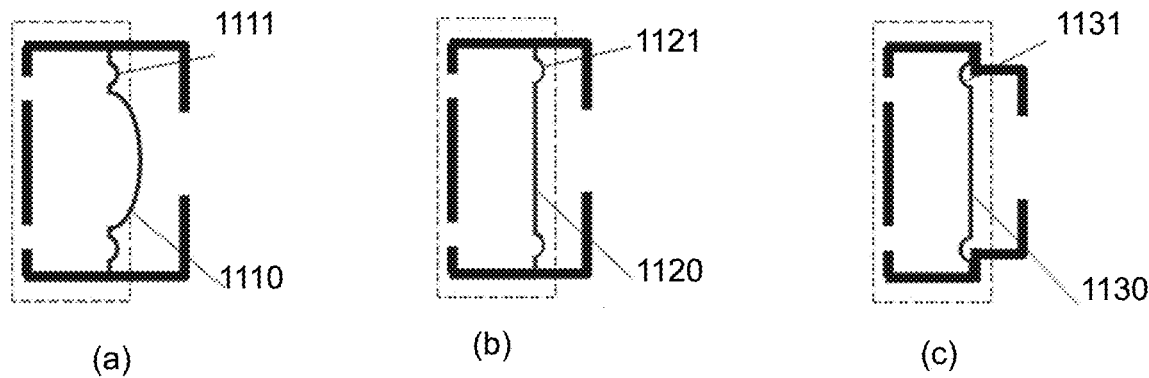
FIG. 11 shows schematic diagrams illustrating structures of a diaphragm according to some embodiments of the present disclosure.

In some embodiments, the diaphragm may be a spherical diaphragm or a conical diaphragm. As shown in image (a) in FIG. 11, when the diaphragm is the spherical diaphragm or the conical diaphragm, since a top of the diaphragm 1110 and a bulge of a folding ring 1111 are higher than other parts of the diaphragm 1110 (i.e., the top of the diaphragm 1110 is closer to an inner wall of the cavity), the cavity may need to have the extra volume to prevent the top of the diaphragm 1110 from colliding with the inner wall of the cavity. In some embodiments, the diaphragm may be a planar diaphragm. In the embodiments of the present disclosure, the planar diaphragm may refer to a diaphragm whose shape is a plane or an approximate plane. As shown in image (b) in FIG. 11, when the diaphragm is a planar diaphragm 1120, compared with the spherical diaphragm or the conical diaphragm, a distance between the planar diaphragm 1120 and the inner wall of the cavity opposite to the planar diaphragm 1120 may be smaller, thereby reducing the volume of the cavity. However, since the folding ring 1121 protrudes outward relative to the planar diaphragm 1120, a certain distance may need to be kept between the planar diaphragm 1120 and the inner wall of the cavity opposite to the planar diaphragm 1120. As shown in image (c) in FIG. 11, in some embodiments, in order to further reduce the distance between the diaphragm 1130 and the inner wall of the cavity, the folding ring 1131 of the diaphragm 1130 may be recessed along a direction away from the cavity. The inner cavity of the housing structure may not need to reserve space for the folding ring 1131, thereby reducing the volume of the cavity. As a result, the position of the high-frequency resonance peak at the sound guiding hole on the cavity may be located at a position with a higher frequency, thereby improving the acoustic output effect of the acoustic output apparatus.

Figure 12:
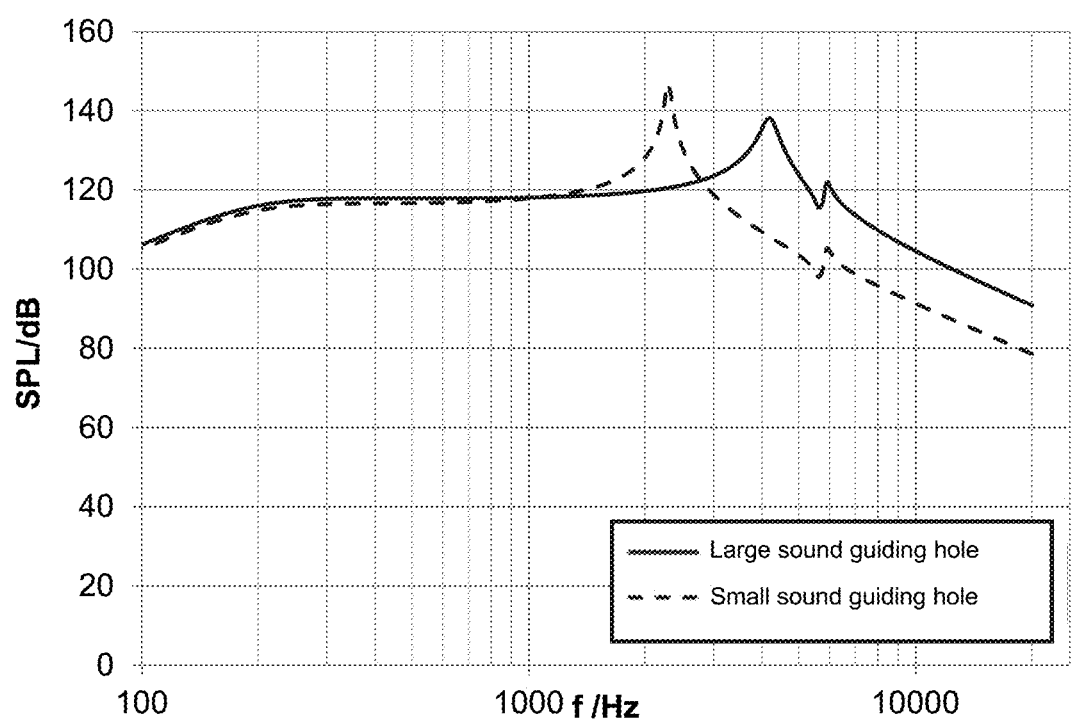
FIG. 12 is a schematic diagram illustrating frequency response curves of acoustic output apparatuses with sound guiding holes of different sizes according to some embodiments of the present disclosure.

In some embodiments, the acoustic output effect of the acoustic output apparatus at the high frequency may be improved by adjusting a size of the sound guiding hole (e.g., the sound guiding hole 512). As shown in FIG. 12, the larger the size of the sound guiding hole may be, the later the position of the resonance peak in the frequency response of the sound guiding hole may be. In some embodiments, a cross-sectional area of the sound guiding hole may not be less than 0.25 mm². In some embodiments, the cross-sectional area of the sound guiding hole may not be less than 0.5 mm². In some embodiments, the cross-sectional area of the sound guiding hole may not be less than 1 mm². In some embodiments, the cross-sectional area of the sound guiding hole may not be less than 2 mm². In some embodiments, the cross-sectional area of the sound guiding hole may not be less than 4 mm². In some embodiments, the cross-sectional area of the sound guiding hole may not be less than 7 mm². In some embodiments, the cross-sectional area of the sound guiding hole may not be less than 10 mm². In some embodiments, by setting the cross-sectional area of the sound guiding hole, the frequency of the resonance peak in the frequency response of the sound guiding hole may not be less than 3 kHz. In some embodiments, by setting the cross-sectional area of the sound guiding hole, the frequency of the resonance peak in the frequency response of the sound guiding hole may not be less than 4 kHz. In some embodiments, by setting the cross-sectional area of the sound guiding hole, the frequency of the resonance peak in the frequency response of the sound guiding hole may not be less than 5 kHz.

As shown in FIG. 6, when the frequency is less than 3 kHz, the amplitude of the frequency response corresponding to the sound guiding hole on the front side of the acoustic driver may be higher than the amplitude of the frequency response corresponding to the sound guiding hole (i.e., the pressure relief hole) on the rear side of the acoustic driver. Therefore, when the frequency is less than 3 kHz, the cancellation effect, in the far-field, of the sound radiated from the sound guiding hole on the front side of the acoustic driver and the sound radiated from the sound guiding hole on the rear side of the acoustic driver may be weakened, and the sound leakage of the acoustic output apparatus may be relatively large. In some embodiments, considering that the human ear(s) is less sensitive to the sound leakage in the frequency range below 500 Hz, the sound leakage of the acoustic output apparatus only in the frequency range of 500 Hz-3 kHz may be further reduced. Taking the acoustic output apparatus 500 as an example for illustration, in some embodiments, by increasing a size and/or a count of the sound guiding hole 524, the amplitude of the frequency response corresponding to the sound guiding hole 524 may be increased. As a result, a difference between the frequency response corresponding to the sound guiding hole 512 and the frequency response corresponding to the sound guiding hole 524 of the acoustic output apparatus in the frequency range of 500 Hz-3 kHz may be reduced. When the frequency responses corresponding to the sound guiding hole 512 and the sound guiding hole 524 are close enough, the sound radiated from the sound guiding hole 512 and the sound radiated from the sound guiding hole 524 may be in inverse phase and cancel each other out, so that the sound leakage volume of the acoustic output apparatus in the frequency range may be reduced. In some embodiments, impedances at the sound guiding hole 512 and the sound guiding hole 524 of the acoustic output apparatus may be adjusted to reduce the sound leakage of the acoustic output apparatus in the mid-low frequency range (e.g., 500 Hz-3 kHz). For example, a sound damping structure (e.g., a structure of tuning net, tuning cotton, sound guiding tube, etc.) may be arranged at the sound guiding hole 512 and/or the sound guiding hole 524 to adjust the amplitude of the corresponding frequency response of the two sound guiding holes, so that the sound leakage volume of the acoustic output apparatus in the mid-low frequency may be reduced. Specifically, referring to the frequency response curves corresponding to the sound guiding holes shown in FIG. 6, a damping structure with a larger impedance may be arranged at the sound guiding hole 512, and no damping structure or a damping structure with a smaller impedance may be arranged at the sound guiding hole 524, so that the frequency responses corresponding to the two sound guiding holes may be closer in the mid-low frequency range.

Figure 13:
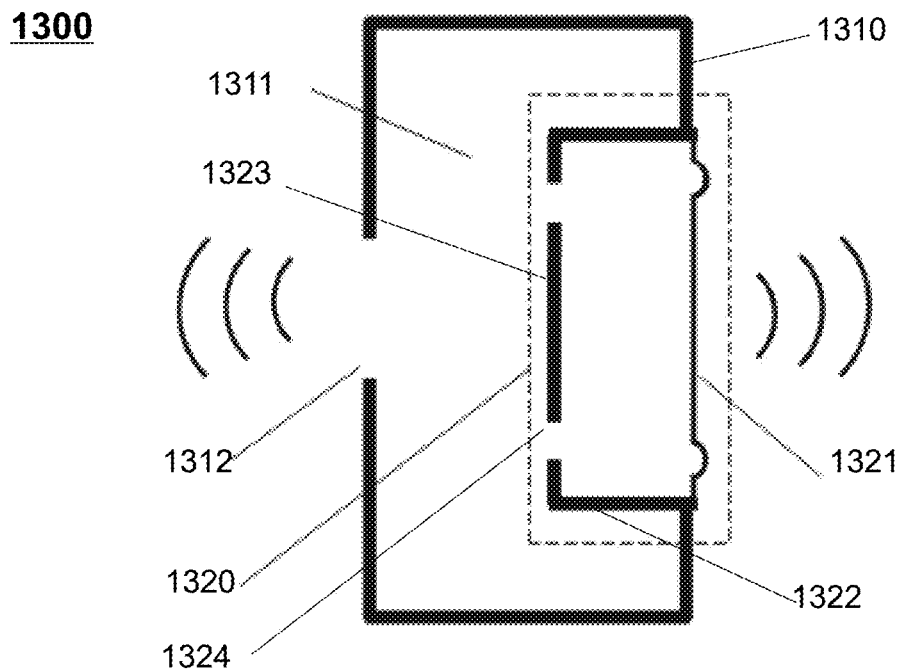
FIG. 13 is a schematic diagram illustrating a structure of an acoustic output apparatus according to some embodiments of the present disclosure.

In some embodiments, a location of the cavity of the acoustic output apparatus may not be limited to the front side of the acoustic driver described above. FIG. 13 is a schematic diagram illustrating a structure of an acoustic output apparatus according to some embodiments of the present disclosure. As shown in FIG. 13, the acoustic output apparatus 1300 may include a housing structure 1310 and an acoustic driver 1320 connected to the housing structure 1310. The acoustic driver 1320 may include a diaphragm 1321 and a magnetic circuit structure 1322. The diaphragm 1321 and the magnetic circuit structure 1322 may be arranged in sequence along a vibration direction of the diaphragm 1321. In some embodiments, the diaphragm 1321 may be mounted on a frame (not shown), and the frame may be fixed on the magnetic circuit structure 1322. Alternatively, the diaphragm 1321 may be directly and fixedly connected to the sidewall of the magnetic circuit structure 1322. A front side of the acoustic driver 1320 may be formed at a side of the diaphragm 1321 away from the magnetic circuit structure 1322. A rear side of the acoustic driver 1320 may be formed at a side of the magnetic circuit structure 1322 away from the diaphragm 1321. The diaphragm may vibrate to cause the acoustic driver 1320 to radiate sound outward from the front side and the rear side of the acoustic driver 1320. The rear side of the acoustic driver 1320 may form a cavity 1311 with the housing structure 1310. The rear side of the acoustic driver may radiate sound towards the cavity 1311, and the front side of the acoustic driver may radiate sound towards directly the outside of the acoustic output apparatus 1300. In some embodiments, the magnetic circuit structure 1322 may include a magnetic conduction plate 1323 arranged opposite to the diaphragm 1321. The magnetic conduction plate 1323 may be provided with one or more sound guiding holes 1324 (also be referred to as pressure relief holes). A sound guiding hole 1324 may guide the sound generated by the vibration of the diaphragm 1321 from the rear side of the acoustic driver 1320 to the cavity 1311. In some embodiments, the housing structure 1310 may be configured with one or more sound guiding holes 1312. A sound guiding hole 1312 may be acoustically coupled with the cavity 1311 and guide the sound radiated to the cavity 1311 by the acoustic driver 1320 to the outside of the acoustic output apparatus 1300. In some cases, a phase of the sound transmitted from the front side of the diaphragm 1321 directly to the outside and a phase of the sound guided from the sound guiding hole 1312 may be opposite or approximately opposite. Therefore, the front side of the diaphragm 1321 and the sound guiding hole 1324 may form a dual-sound source as shown in FIG. 3.

In some embodiments, the diaphragm 1321 may be embedded in the sidewall of the housing structure 1310, and the sound generated at the front side of the diaphragm 1321 may be directly transmitted to the outside. For example, a mounting hole (not shown) may be arranged on the sidewall of the housing structure 1310, and the diaphragm 1321 may be arranged at the mounting hole. In some embodiments, the diaphragm 1321 may not be arranged on the housing structure 1310. For example, a side of the acoustic driver 1320 with the diaphragm 1321 may be protruded outward or recessed inward relative to the housing structure 1310, and the acoustic driver 1320 may be fixedly connected to the housing structure 1310 via the magnetic circuit structure 1322.

Figure 14:
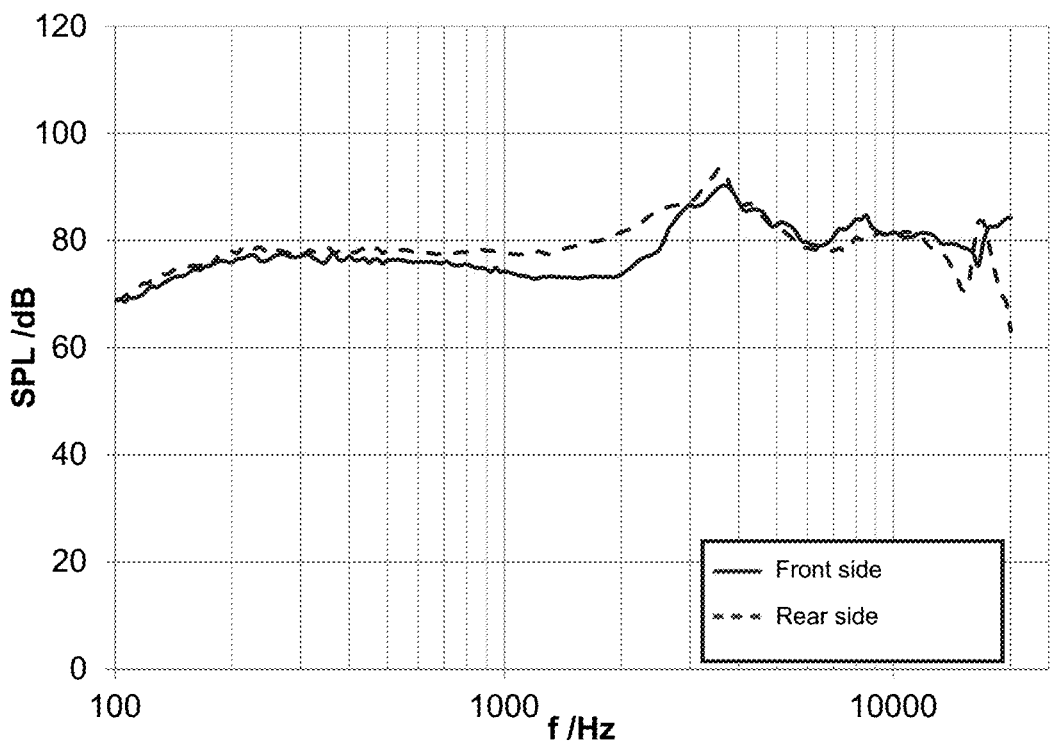
FIG. 14 is a schematic diagram illustrating frequency response curves of a front side and rear side of an acoustic output apparatus according to some embodiments of the present disclosure.

FIG. 14 is a schematic diagram illustrating frequency response curves of a front side and rear side of an acoustic output apparatus according to some embodiments of the present disclosure. In combination with FIG. 2 and FIG. 14, in the frequency range of 100 Hz-10 kHz, compared with the acoustic output apparatus 100, for the acoustic output apparatus 1300 disclosed in the present disclosure, consistency of the frequency response corresponding to the front side and the rear side of the acoustic driver 1320 may be significantly improved. In such cases, since the phases of the sounds radiated from the front side and the rear side of the acoustic driver 1320 may be opposite or approximately opposite, the sounds radiated from the front side and the rear side of the acoustic driver 1320 may cancel each other out in the far-field, thereby improving the reduction effect of the sound leakage of the acoustic output apparatus 1300 in each frequency range.

Figure 15:
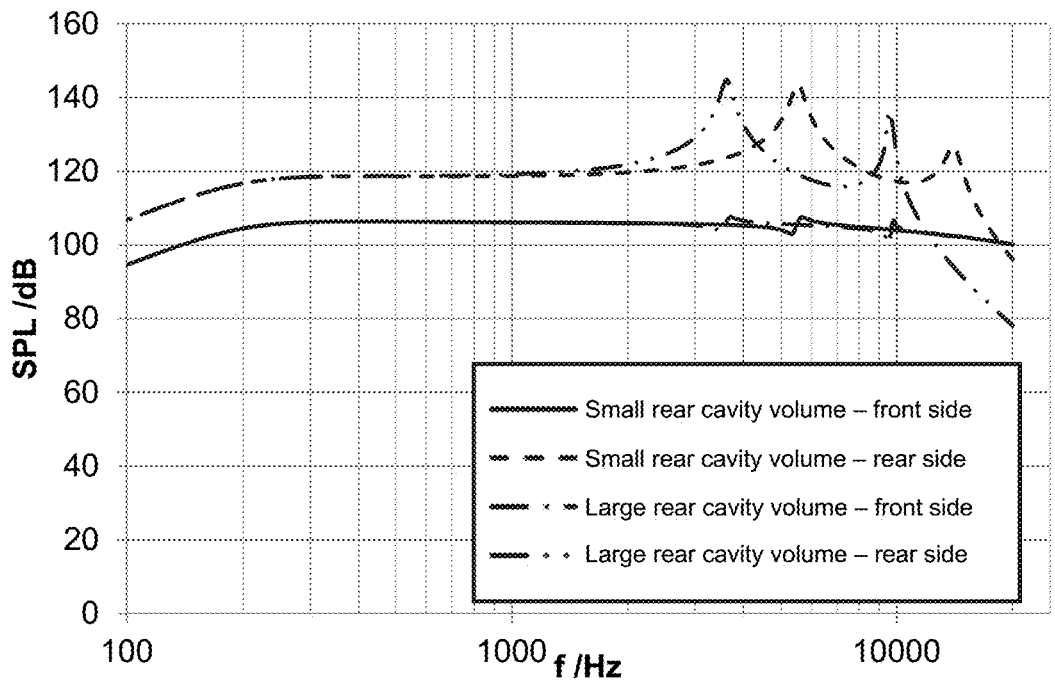
FIG. 15 is a schematic diagram illustrating frequency response curves of a front side and rear side of acoustic output apparatuses with different cavity volumes according to some embodiments of the present disclosure.

In some embodiments, the acoustic output effect of the acoustic output apparatus 1300 at the high frequency may be improved by adjusting a volume of the cavity 1311. As shown in FIG. 15, in the mid-high frequency range (e.g., 3 kHz-7 kHz), when the volume of the cavity 1311 (also be referred to as a rear cavity herein) is small ("small rear cavity volume-front side" shown in FIG. 15), a frequency response curve corresponding to the front side of the acoustic driver 1320 may be relatively flat compared to a frequency response curve corresponding to the front side of the acoustic driver 1320 when the volume of the cavity 1311 is large ("large rear cavity volume-front side" shown in FIG. 15). That is, the smaller the volume of the cavity 1311 may be, the better the frequency response of the front side of the acoustic driver 1320 in the mid-high frequency range may be. In addition, when the volume of the cavity 1311 is small ("small rear cavity volume-rear side" shown in FIG. 15), a frequency response curve corresponding to the rear side of the acoustic driver 1320 may have a higher resonance peak position than a frequency response curve corresponding to the rear side of the acoustic driver 1320 when the volume of the cavity 1311 is large ("large rear cavity volume-rear side" shown in FIG. 15). That is, the smaller the volume of the cavity 1311 may be, the later the frequency of the resonance peak corresponding to the rear side of the acoustic driver 1320 may be.

In some embodiments, the acoustic output effect of the acoustic output apparatus 1300 at the high frequency may be improved by adjusting an effective height of the cavity 1311. In some embodiments, the effective height h of the cavity may not be greater than 3 mm. In some embodiments, the effective height h of the cavity may not be greater than 2 mm. In some embodiments, the effective height h of the cavity may not be greater than 1 mm. In some embodiments, the effective height h of the cavity may not be greater than 0.5 mm. In some embodiments, the effective height h of the cavity may not be greater than 0.4 mm. In some embodiments, the effective height h of the cavity may not be greater than 0.2 mm. In some embodiments, by setting the volume of the cavity 1311, the frequency of the resonance peak in the frequency response of the sound guiding hole 1312 may not be less than 2.5 kHz. In some embodiments, by setting the volume of the cavity 1311, the frequency of the resonance peak in the frequency response of the sound guiding hole 1312 may not be less than 5 kHz. In some embodiments, by setting the volume of the cavity 1311, the frequency of the resonance peak in the frequency response of the sound guiding hole 1312 may not be less than 7 kHz. In some embodiments, by setting the volume of the cavity 1311, the frequency of the resonance peak in the frequency response of the sound guiding hole 1312 may not be less than 10 kHz. The details about the cavity volume and the effective height h may refer to FIG. 10 and related contents of the specification of the present disclosure.

Figure 16:
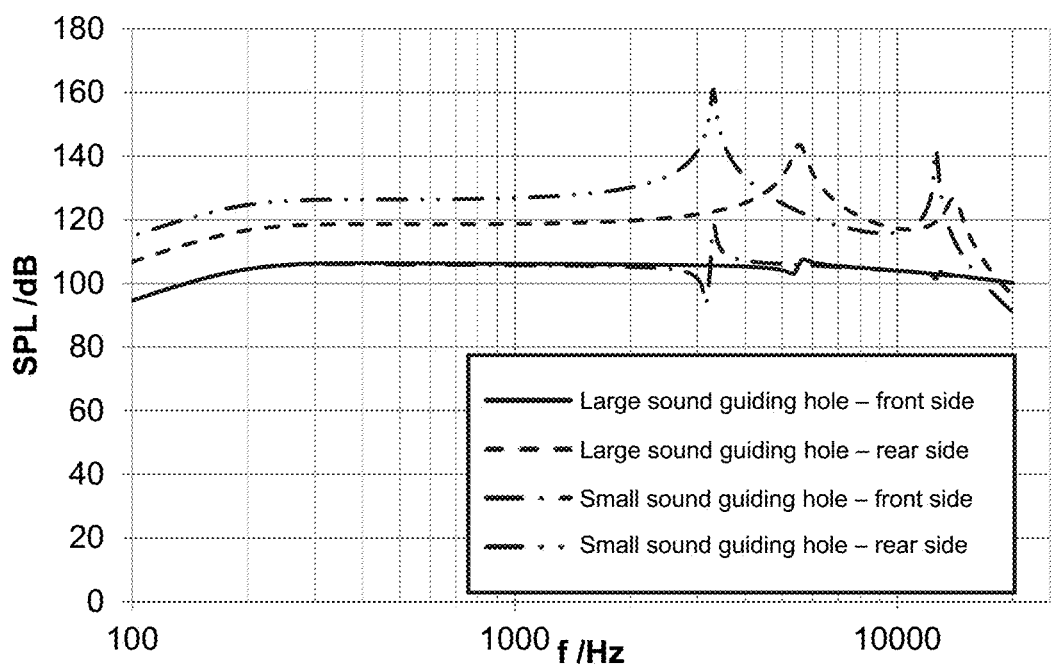
FIG. 16 is a schematic diagram illustrating frequency response curves of a front side and rear side of acoustic output apparatuses with sound guiding holes of different sizes according to some embodiments of the present disclosure.

In some embodiments, the acoustic output effect of the acoustic output apparatus at the high frequency may be improved by adjusting a size of the sound guiding hole 1312. As shown in FIG. 16, in the mid-high frequency range (e.g., 3 kHz-7 kHz), a frequency response curve corresponding to the front side of the acoustic driver 1320 when the size of the sound guiding hole 1312 is large ("large sound guiding hole—front side" shown in FIG. 16) may be relatively flat compared to a frequency response curve corresponding to the front side of the acoustic driver 1320 when the size of the sound guiding hole 1312 is small ("small sound guiding hole—front side" shown in FIG. 16). That is, the larger the size of the sound guiding hole 1312 may be, the better the frequency response of the front side of the acoustic driver 1320 in the mid-high frequency range may be. In addition, when the size of the sound guiding hole 1312 is large ("large sound guiding hole—rear side" shown in FIG. 16), a frequency response curve corresponding to the rear side of the acoustic driver 1320 may have a higher resonance peak position than a frequency response curve corresponding to the rear side of the acoustic driver 1320 when the size of the sound guiding hole 1312 is small ("small sound guiding hole—rear side" shown in FIG. 16). That is, the larger the size of the sound guiding hole 1312 may be, the later the frequency of the resonance peak corresponding to the rear side of the acoustic driver 1320 may be, and the better the frequency response of the acoustic output apparatus in the mid-high frequency range may be. In some embodiments, a cross-sectional area of the sound guiding hole may not be less than 0.25 mm$^2$. In some embodiments, the cross-sectional area of the sound guiding hole may not be less than 0.5 mm$^2$. In some embodiments, the cross-sectional area of the sound guiding hole may not be less than 1 mm$^2$. In some embodiments, the cross-sectional area of the sound guiding hole may not be less than 2 mm$^2$. In some embodiments, the cross-sectional area of the sound guiding hole may not be less than 4 mm$^2$. In some embodiments, the cross-sectional area of the sound guiding hole may not be less than 7 mm$^2$. In some embodiments, the cross-sectional area of the sound guiding hole may not be less than 10 mm$^2$. In some embodiments, by setting the cross-sectional area of the sound guiding hole, the frequency of the resonance peak in the frequency response of the sound guiding hole may not be less than 3 kHz. In some embodiments, by setting the cross-sectional area of the sound guiding hole, the frequency of the resonance peak in the frequency response of the sound guiding hole may not be less than 4 kHz. In some embodiments, by setting the cross-sectional area of the sound guiding hole, the frequency of the resonance peak in the frequency response of the sound guiding hole may not be less than 5 kHz.

Figure 17:
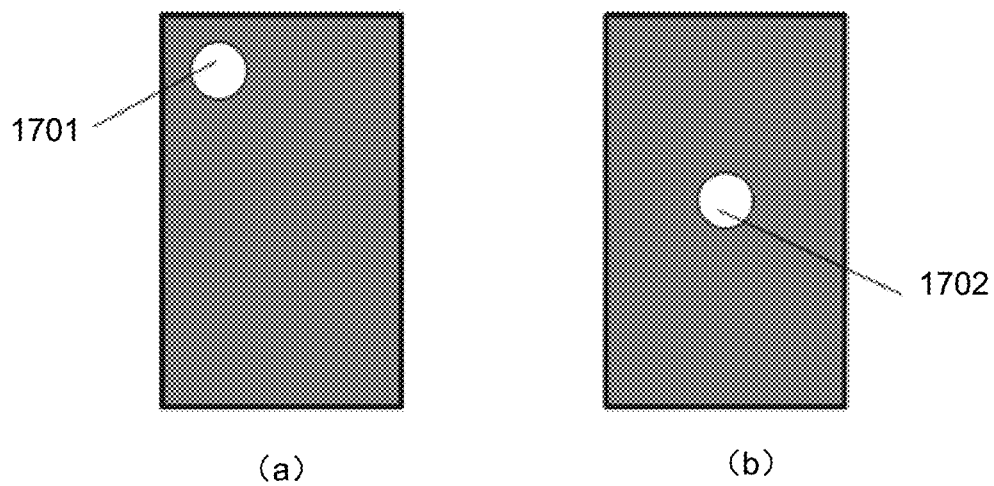
FIG. 17 shows schematic diagrams illustrating position distributions of a sound guiding hole according to some embodiments of the present disclosure.
Figure 18:
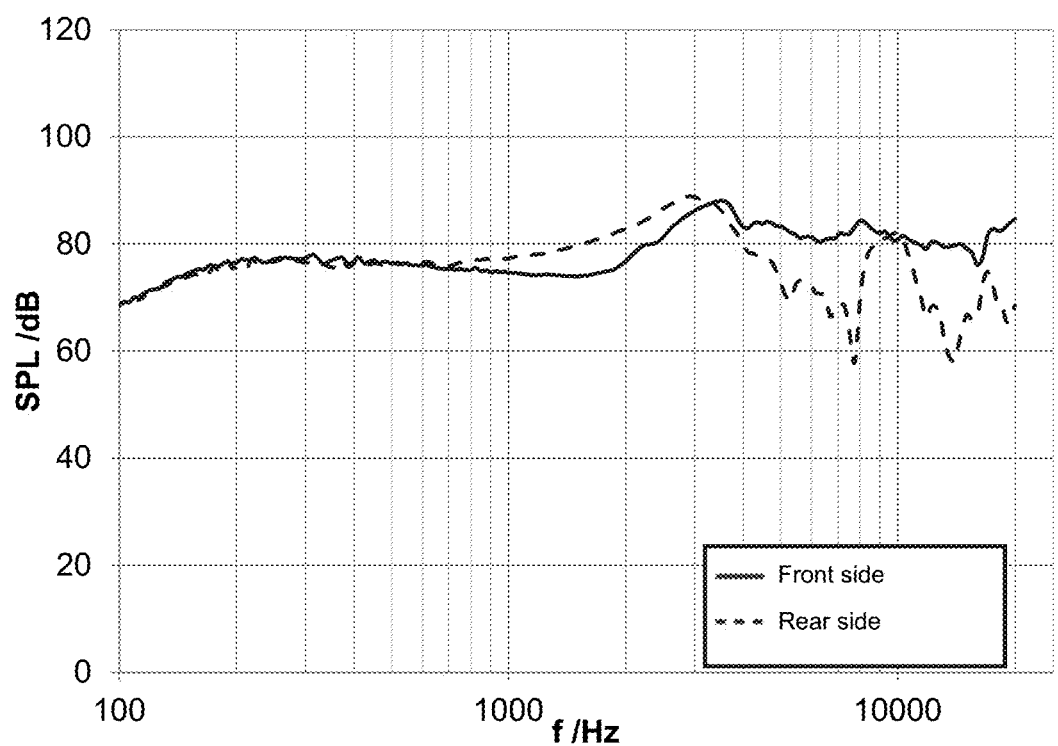
FIG. 18 is a schematic diagram illustrating frequency response curves of a front side and rear side of an acoustic driver with the sound guiding hole of the position distribution shown in image (a) in FIG. 17.
Figure 19:
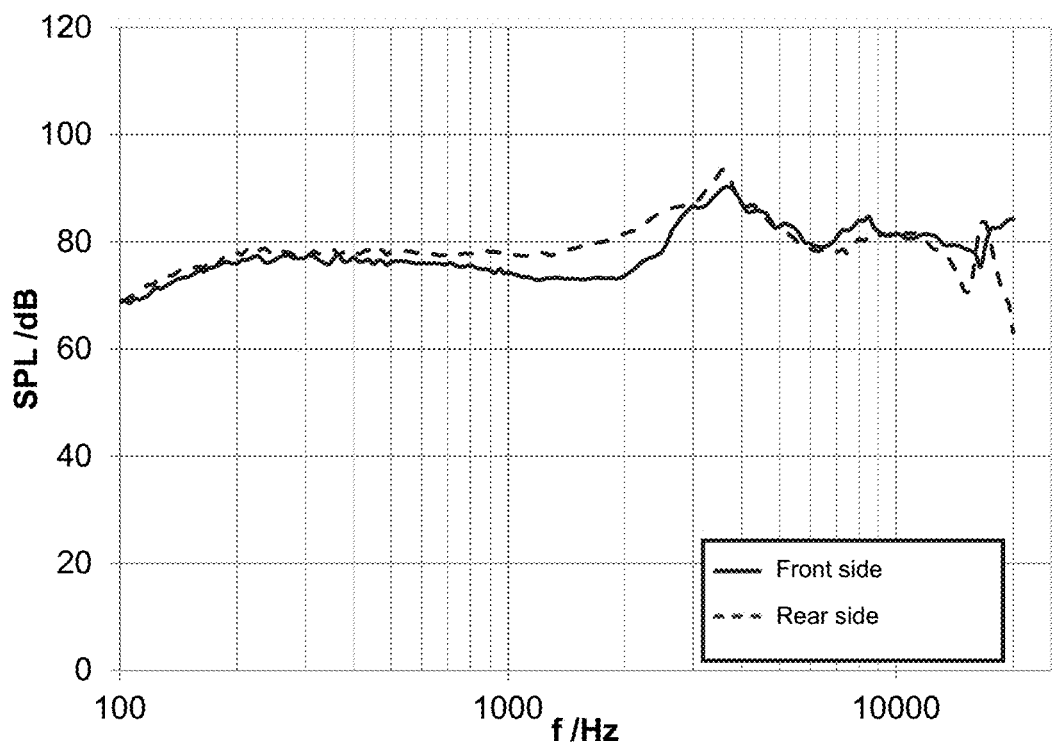
FIG. 19 is a schematic diagram illustrating frequency response curves of a front side and rear side of an acoustic driver with the sound guiding hole of the position distribution shown in image (b) in FIG. 17.

In some embodiments, the acoustic output effect of the acoustic output apparatus at the high frequency may be improved by adjusting a position of the sound guiding hole 1312. In some embodiments, the sound guiding hole may be arranged near a center of the sidewall (referred to as a front sidewall of the housing structure for brief) of the housing structure opposite the front side or the rear side of the acoustic driver. When the sound guiding hole is close to the center of the front sidewall of the housing structure, the frequency response curves of the front side and the rear side of the acoustic driver 1320 may have high consistency. In such cases, since phases of the sounds radiated from the front side and the rear side of the acoustic driver 1320 may be opposite or approximately opposite, the sounds radiated from the front side and the rear side of the acoustic driver 1320 may cancel each other out in the far-field, thereby improving the reduction effect of the sound leakage of the acoustic output apparatus 1300 in each frequency range. FIG. 17 shows schematic diagrams illustrating position distributions of a sound guiding hole according to some embodiments of the present disclosure. A sound guiding hole 1701 in image (a) in FIG. 17 may be far from the center of the front sidewall of the housing structure. A sound guiding hole 1702 in image (b) in FIG. 17 may be close to the center of the front sidewall of the housing structure. FIG. 18 is a schematic diagram illustrating frequency response curves of a front side and rear side of an acoustic driver with the sound guiding hole of the position distribution shown in image (a) in FIG. 17. FIG. 19 is a schematic diagram illustrating frequency response curves of a front side and rear side of an acoustic driver with the sound guiding hole of the position distribution shown in image (b) in FIG. 17. As shown in FIG. 18, in the high-mid or high-frequency range (e.g., 3 kHz-10 kHz), when the sound guiding hole 1701 is far away from the center of the front sidewall of the housing structure, the frequency response curves of the front side and the rear side of the acoustic driver may be quite different, which may cause the sound leakage of the acoustic output apparatus to be large in the frequency range. As shown in FIG. 19, in the range of 100 Hz-10 kHz, when the sound guiding hole 1702 is close to the center of the sidewall of the housing structure, the frequency response curves of the front side and the rear side of the acoustic driver may be highly consistent. In such cases, in the far-field, the sounds radiated from the front side and the rear side of the acoustic driver may cancel each other out, thereby improving the reduction effect of the sound leakage of the acoustic output apparatus in the frequency range. It should be noted that, in other embodiments, a count of the sound guiding hole 1701 and the sound guiding hole 1702 may not be limited to one, and may be two, three, or more. When a plurality of sound guiding holes are arranged on the front sidewall of the housing structure, these sound guiding holes may all be arranged close to the center of the sidewall of the housing structure, or all arranged away from the center of the sidewall of the housing structure, or a portion of these sound guiding holes are arranged near the center of the sidewall of the housing structure, and others are arranged away from the center of the sidewall of the housing structure. In addition, shapes of the sound guiding hole 1701 and the sound guiding hole 1702 may not be limited to the circle in FIG. 17, but may also be a semicircle, an ellipse, or the like. Those skilled in the art may make adaptive adjustments to the numbers and the shapes of the sound guiding hole 1701 and the sound guiding hole 1702 according to specific conditions, which are not further limited herein. The application scenario in which the sound guiding holes are close to the center of the front sidewall of the housing structure is not only be limited to the acoustic output apparatus 1300 shown in FIG. 13, but also applies to the acoustic output apparatuses in other embodiments of the present disclosure, for example, the acoustic output apparatuses shown in FIG. 1, FIG. 5, FIG. 7, and FIG. 9.

In some embodiments, referring to the corresponding frequency response curves of the front side and the rear side of the acoustic driver shown in FIG. 14, the impedance at the sound guiding hole 1312 of the acoustic output apparatus may be adjusted (e.g., a damping structure with a certain impedance may be arranged at the sound guiding hole 1312) to make the corresponding frequency response curves of the front side and the rear side of the acoustic driver closer in a certain frequency range (e.g., 500 Hz-3 kHz), thereby reducing the sound leakage of the acoustic output apparatus in the frequency range. For example, a sound damping structure (e.g., a tuning net, tuning cotton, a sound guiding tube, etc.) may be arranged at the sound guiding hole 1312 to reduce the amplitude of the frequency response corresponding to the rear side of the acoustic driver, so that the amplitude of the frequency response corresponding to the rear side of the acoustic driver may be close to or equal to the amplitude of the frequency response corresponding to the front side of the acoustic driver.

Figure 20:
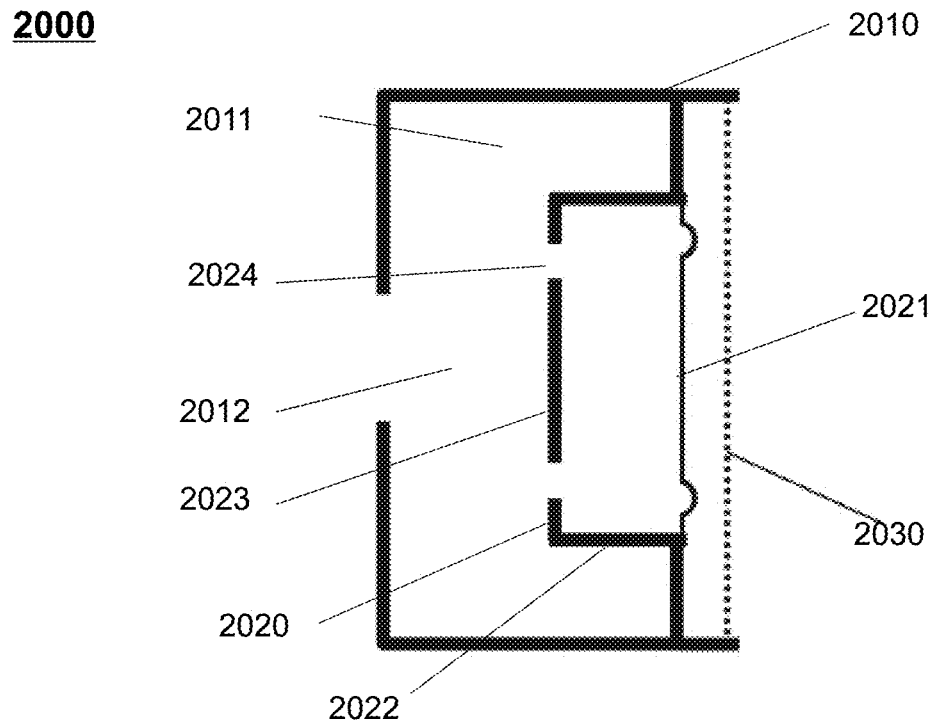
FIG. 20 is a schematic diagram illustrating a structure of an acoustic output apparatus according to some embodiments of the present disclosure.

FIG. 20 is a schematic diagram illustrating a structure of an acoustic output apparatus according to some embodiments of the present disclosure. The structure of an acoustic output apparatus 2000 shown in FIG. 20 is similar to the structure of the acoustic output apparatus 1300 shown in FIG. 13. The details about a housing structure 2010, an acoustic driver 2020, a diaphragm 2021, a magnetic circuit structure 2022, a magnetic conduction plate 2023, sound guiding holes 2024, and a sound guiding hole 2012 may refer to FIG. 13 and the related contents. The difference between the acoustic output apparatus 2000 shown in FIG. 20 and the acoustic output apparatus 1300 shown in FIG. 13 is that, in some embodiments, in order to protect the diaphragm 2021, a protection structure 2030 may be arranged on an outer side of the diaphragm 2021. The protection structure 2030 may be fixedly connected with the housing structure 2010. In some embodiments, the protection structure 2030 may be a structure that allows the sound generated at the front side of the diaphragm 2021 to be transmitted to the outside. For example, the protection structure 2030 may be a filter net structure. As another example, the protection structure 2030 may be a plate structure with holes. In some embodiments, there may be a certain distance between the protection structure 2030 and the front side of the diaphragm 2021. The distance may prevent the diaphragm 2021 from colliding with the protection structure 2030 during the vibration process. The details about the type and structure of the diaphragm 2021 may refer to the diaphragm shown in FIG. 11 of the present disclosure, which is not repeated herein.

Figure 21:
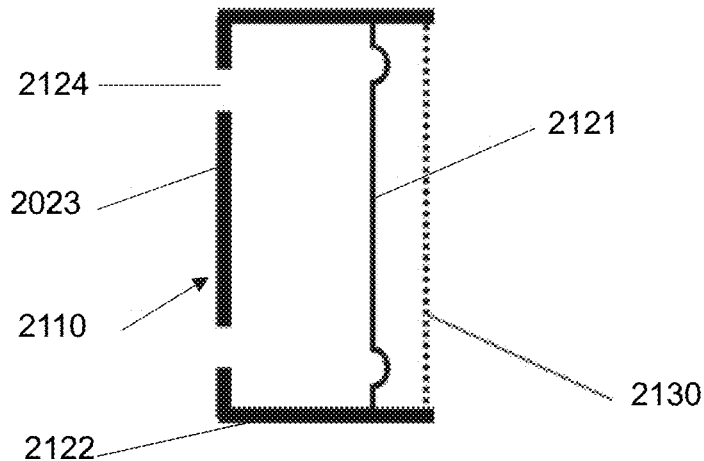
FIG. 21 is a schematic diagram illustrating a structure of an acoustic output apparatus according to some embodiments of the present disclosure.

FIG. 21 is a schematic diagram illustrating a structure of an acoustic output apparatus according to some embodiments of the present disclosure. The difference between an acoustic output apparatus 2100 shown in FIG. 21 and the acoustic output apparatus 500 shown in FIG. 5 or the acoustic output apparatus 1300 shown in FIG. 13 is that, the acoustic output apparatus 2100 shown in FIG. 21 does not include a cavity formed by the housing structure and the acoustic driver. As shown in FIG. 21, the acoustic output apparatus 2100 may include an acoustic driver 2110. The acoustic driver 2110 may include a diaphragm 2121 and a magnetic circuit structure 2122. The diaphragm 2121 and the magnetic circuit structure 2122 may be arranged in sequence along a vibration direction of the diaphragm 2121. In some embodiments, the diaphragm 2121 may be mounted on a frame (not shown), and the frame may be fixed on the magnetic circuit structure 2122. Alternatively, the diaphragm 2121 may be directly and fixedly connected to a sidewall of the magnetic circuit structure 2122. A front side of the acoustic driver 2110 may be formed at a side of the diaphragm 2121 away from the magnetic circuit structure 2122. A rear side of the acoustic driver 2110 may be formed at a side of the magnetic circuit structure 2122 away from the diaphragm 2121. The diaphragm 2121 may vibrate to cause the acoustic driver 2110 to radiate sound outward from the front side and the rear side of the acoustic driver 2110. The front side of the acoustic driver 2110 may radiate the sound directly to the outside. A magnetic conduction plate 2123 of the magnetic circuit structure 2122 may be configured with one or more sound guiding holes 2124. A sound guiding hole 2124 may directly guide the sound generated by the vibration of the diaphragm 2121 from the rear side of the acoustic driver 2110 to the outside. In some embodiments, the acoustic output apparatus 2100 may further include a protection structure 2130. The protection structure 2130 may be fixedly connected with the magnetic circuit structure 2122. The details about the protection structure 2130 may refer to the protection structure 2030 described above. In some embodiments, a phase of the sound guided from the sound guiding hole 2124 and a phase of the sound radiated from the front side of the diaphragm 2121 may be opposite or approximately opposite. Therefore, the sound guiding hole 2124 and the front side of the diaphragm 2121 may form a dual-sound source as shown in FIG. 3.

Figure 22:
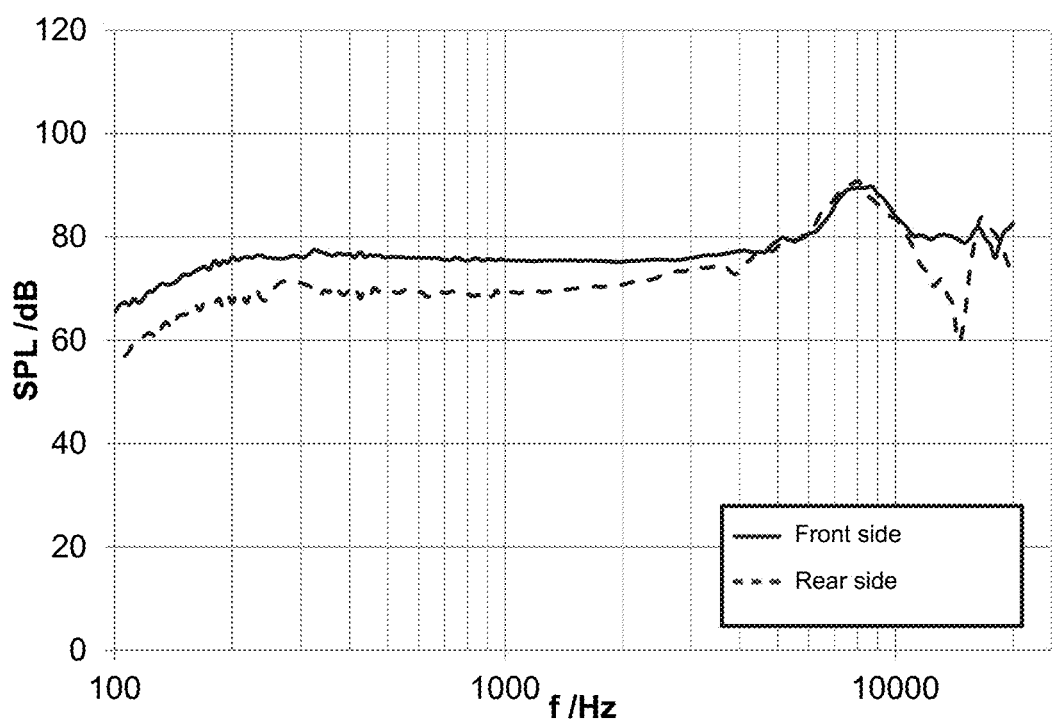
FIG. 22 is a schematic diagram illustrating frequency response curves of a front side and rear side of an acoustic output apparatus that does not include a cavity according to some embodiments of the present disclosure.

FIG. 22 is a schematic diagram illustrating frequency response curves of a front side and rear side of the acoustic output apparatus 2100 in FIG. 21 of the present disclosure. As shown in FIG. 22, when the acoustic output apparatus 2100 does not include the cavity formed by the housing structure and the acoustic driver, resonance peaks of a frequency response output by the acoustic output apparatus 2100 (the front side and the rear side of the acoustic driver 2110) at the high frequency may be all located at a higher frequency (e.g., greater than 6 kHz). In the high-frequency range greater than 10 kHz, the acoustic output apparatus 2100 may generate a specific sound field with a certain directivity. The directivity of the sound at the high frequency may be used to achieve the effect of large listening volume in the near-field and small sound leakage volume in the far-field. In the mid-high frequency range (e.g., 3 kHz-7 kHz), the frequency responses of the front side and the rear side of the acoustic output apparatus 2100 may be very close. Since phases of the sounds radiated from the front side and the rear side of the acoustic output apparatus 2100 are opposite, the sound leakage of the acoustic output apparatus 2100 in the frequency range may be significantly reduced. In the low frequency range (e.g., less than 3 kHz), although the frequencies of the front side and the rear side of the acoustic output apparatus 2100 are different to a certain extent, since the human ear is not sensitive to sound leakage at low frequency, it may be no need to reduce the sound leakage in the far-field in the frequency range. Alternatively, a damping structure with a greater impedance may be arranged at the diaphragm 2121, and no damping structure or a damping structure with a smaller impedance may be arranged at the sound guiding hole 2124, so that the frequency responses of the front side and the rear side of the acoustic driver 2110 may be closer in the mid-low frequency range. Regarding the effect of using the directivity of sound at high frequency to achieve the effect of large listening volume in the near-field and low sound leakage in the far-field in this embodiment, refer to FIG. 5 and related descriptions of the present disclosure.

Figure 23:
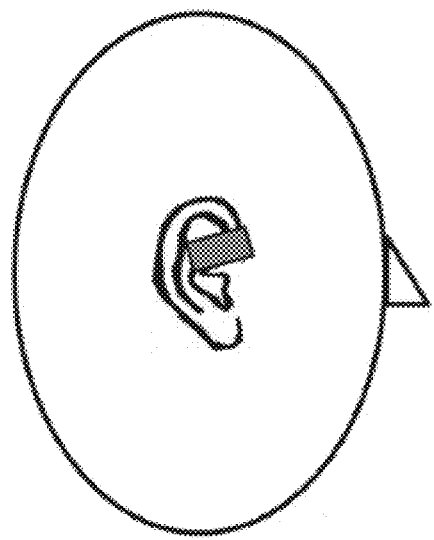
FIG. 23 shows schematic diagrams illustrating wearing manners of an acoustic output apparatus according to some embodiments of the present disclosure.
Figure 23:
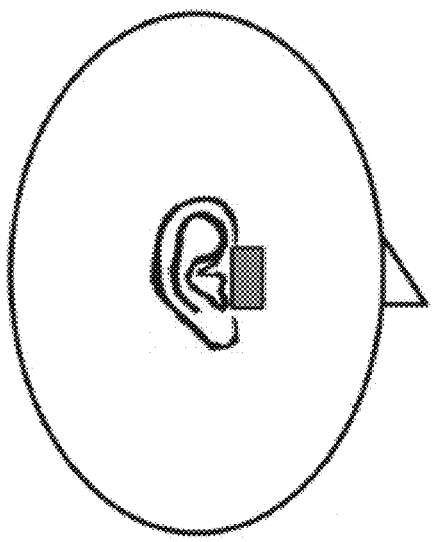
Figure 23:
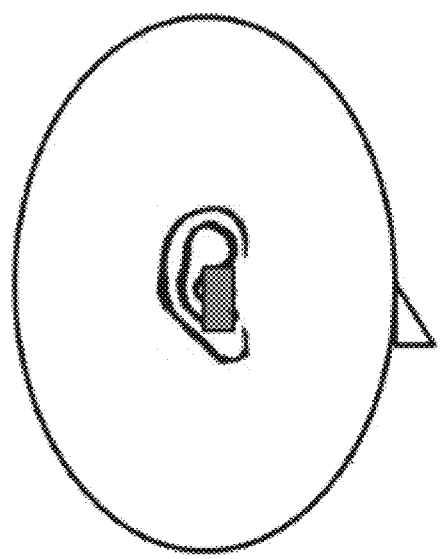
Figure 23:
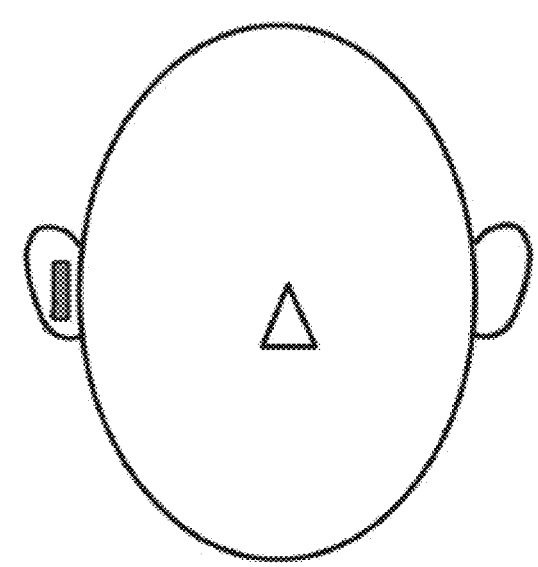

In some embodiments, when a user wears the acoustic output apparatus, a wearing position of the acoustic output apparatus may be the upper half of the torso of the user. For example, the wearing position may be the head close to the ears. As shown in FIG. 23, a rectangular structure in FIG. 23 is an acoustic output apparatus. As shown in images (a) and (b) in FIG. 23, a sound output position (e.g., a sound guiding hole, a pressure relief hole, or a diaphragm) of the acoustic output apparatus may be within or outside a projection of a vector plane (e.g., concha cavity) of an auricle. As shown in images (c) and (d) in FIG. 23, the acoustic output apparatus may be suspended above the ear canal through a corresponding structure (e.g., a hook), but does not block the ear canal.

Figure 24:
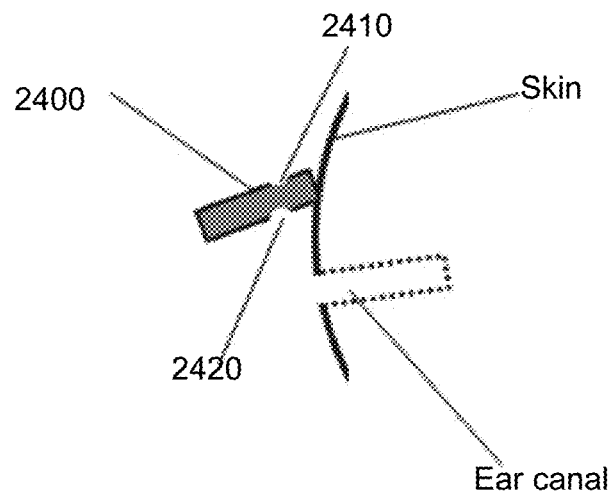
FIG. 24 is a schematic diagram illustrating positional relationships between a front side and rear side of an acoustic output apparatus and human skin according to some embodiments of the present disclosure.

In some embodiments, in order to improve the acoustic output effect of the acoustic output apparatus, the housing structure of the acoustic output apparatus may be used as a baffle, thereby increasing a volume at a listening position without increasing the sound leakage in the far-field. As shown in FIG. 24, a sound output position 2410 on the front side of an acoustic output apparatus 2400 and a sound output position 2420 (e.g., a sound guiding hole, a pressure relief hole, or a diaphragm) on the rear side of the acoustic output apparatus 2400 (e.g., the acoustic driver) may be arranged on opposite sides of the acoustic output apparatus 2400, and separated by the housing (e.g., the housing structure) of the acoustic output apparatus 2400, so that the housing of the acoustic output apparatus 2400 may be used as a baffle. In some embodiments, a sound path from one side (e.g., the side that the "sound guiding hole 1" in FIG. 8 is located, the front side of the acoustic driver in FIG. 18) of the front side and the rear side of the acoustic output apparatus 2400 with a larger amplitude of high-frequency response to an ear may be less than a sound path from the other side of the front side and the rear side to the ear. In some embodiments, the side of the front side and the rear side of the acoustic output apparatus 2400 with the larger amplitude of high-frequency response may face an ear canal.

Figure 25:
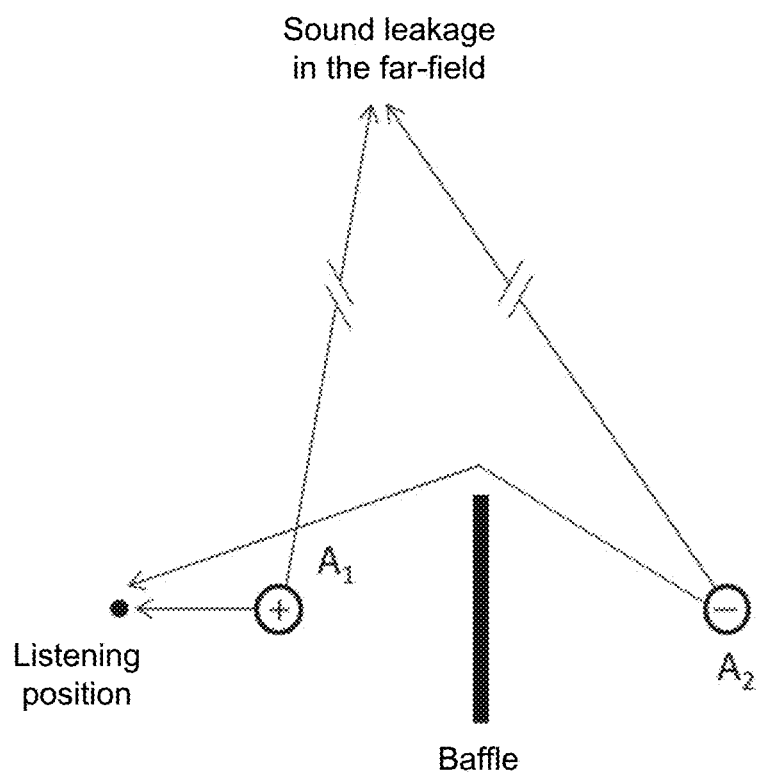
FIG. 25 is a schematic diagram illustrating a housing structure used as a baffle according to some embodiments of the present disclosure.

The principle of using the housing structure of the acoustic output apparatus as a baffle is shown in FIG. 25. In the near-field, the "baffle" (e.g., the housing structure) may increase a sound path from a sound source $A_2$ far away from a listening position to the listening position, so that an intensity of an anti-phase sound wave, reaching the listening position, of the sound source $A_2$ may be weakened. In such cases, a degree of interference cancellation, at the listening position, of the sounds radiated from the sound source $A_1$ and the sound source $A_2$ may be reduced, thereby increasing a volume at the listening position. In the far-field, the "baffle" (e.g., the housing structure) may have little effect on sound paths of the sound source $A_1$ and the sound source $A_2$, so that the sound leakage in the far-field may be basically unchanged.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. In addition, some features, structures, or features in the present disclosure of one or more embodiments may be appropriately combined.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, all aspects of the present disclosure may be performed entirely by hardware, may be performed entirely by softwares (including firmware, resident softwares, microcode, etc.), or may be performed by a combination of hardware and softwares. The above hardware or softwares can be referred to as "data block", "module", "engine", "unit", "component" or "system". In addition, aspects of the present disclosure may appear as a computer product located in one or more computer-readable media, the product including computer-readable program code.

Computer storage media may contain a transmitted data signal containing a computer program code, for example on baseband or as part of a carrier wave. The propagation signal may have a variety of expressions, including electromagnetic form, optical form, etc., or suitable combinations. The computer storage medium may be any computer-readable medium other than the computer-readable storage medium, and the medium may be connected to an instruction to execute a device, device, or device to communicate, spread, or transmit a program for use. Program encoding on a computer storage medium may be propagated by any suitable medium, including radio, cable, fiber optic cable, RF, or a similar medium, or a combination of the above media.

Computer program code for carrying out operations for aspects of the present disclosure may be written in any combination of one or more programming languages, including an object-oriented programming language such as Java, Scala, Smalltalk, Eiffel, JADE, Emerald, C++, C#, VB. NET, Python, or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer, and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

In addition, unless clearly stated in the claims, the order of processing elements and sequences, the use of numbers and letters, or the use of other names in the present disclosure are not used to limit the order of the procedures and methods of the present disclosure. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities of ingredients, properties, and so forth, used to describe and claim certain embodiments of the application are to be understood as being modified in some instances by the term "about," "approximate," or "substantially". Unless otherwise stated, "about," "approximate," or "substantially" may indicate ±20% variation of the value it describes. Accordingly, in some embodiments, the numerical parameters used in the specification and claims are approximate values, and the approximation may change according to the characteristics required by the individual embodiments. In some embodiments, the numerical parameter should consider the prescribed effective digits and adopt a general digit retention method. Although in some embodiments, the numerical fields and parameters used to confirm the breadth of its range are approximate values, in specific embodiments, such numerical values are set as accurately as possible within the feasible range.

Each patent, patent application, patent application publication, and other materials cited herein, such as articles, books, instructions, publications, documents, etc., are hereby incorporated by reference in their entirety. The application history documents that are inconsistent or conflicting with the content of the present disclosure are excluded, and documents that restrict the broadest scope of the claims of the present disclosure (currently or later attached to the present disclosure) are also excluded. It should be noted that if there is any inconsistency or conflict between the description, definition, and/or terminology in the accompanying materials of the present disclosure and the content described in the present disclosure, the description, definition, and/or terminology in the present disclosure shall prevail.

At last, it should be understood that the embodiments described in the present disclosure are merely illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. An acoustic output apparatus, comprising:
    an acoustic driver including a diaphragm and a magnetic circuit structure, wherein a front side of the acoustic driver is formed at a side of the diaphragm away from the magnetic circuit structure, a rear side of the acoustic driver is formed at a side of the magnetic circuit structure away from the diaphragm, and the diaphragm vibrates to cause the acoustic driver to radiate sound outward from the front side and the rear side of the acoustic driver; and
    a housing structure configured to carry the acoustic driver, wherein
        one side of the front side and the rear side of the acoustic driver forms a cavity with the housing structure, the side of the acoustic driver forming the cavity radiates the sound towards the cavity, and the other side of the acoustic driver radiates the sound towards outside of the acoustic output apparatus, wherein a height of the cavity along a vibration direction of the diaphragm is not greater than 3 mm.

2. The acoustic output apparatus of claim 1, wherein the housing structure includes at least one sound guiding hole, the at least one sound guiding hole being acoustically coupled with the cavity and guiding the sound radiated to the cavity by the acoustic driver to the outside of the acoustic output apparatus.

3. The acoustic output apparatus of claim 2, wherein the at least one sound guiding hole is arranged close to a center of a side of the housing structure facing the acoustic driver.

4. The acoustic output apparatus of claim 2, wherein a cross-sectional area of the at least one sound guiding hole is not less than 0.25 mm2.

5. The acoustic output apparatus of claim 1, wherein the magnetic circuit structure includes a magnetic conduction plate arranged opposite to the diaphragm, the magnetic conduction plate includes at least one sound guiding hole, and the at least one sound guiding hole guides the sound generated by the vibration of the diaphragm from the rear side of the acoustic driver to the outside of the acoustic output apparatus.

6. The acoustic output apparatus of claim 5, wherein the front side of the acoustic driver and the housing structure form the cavity, and the at least one sound guiding hole guides the sound generated by the vibration of the diaphragm from the rear side of the acoustic driver to the outside of the acoustic output apparatus.

7. The acoustic output apparatus of claim 5, wherein a sound guiding tube is arranged on the at least one sound guiding hole along a direction away from the diaphragm, and the sound guiding tube guides the sound radiated from the at least one sound guiding hole to the outside of the acoustic output apparatus.

8. The acoustic output apparatus of claim 5, wherein the at least one sound guiding hole includes a first hole portion and a second hole portion sequentially arranged from inside to outside, the first hole portion penetrates through the second hole portion, and a diameter of the second hole portion is larger than a diameter of the first hole portion.

9. The acoustic output apparatus of claim 1, wherein a shape of the diaphragm is flat or approximately flat.

10. The acoustic output apparatus of claim 1, wherein the diaphragm is fixed on the acoustic driver through a folding ring, and the folding ring is recessed along a direction away from the cavity.

11. The acoustic output apparatus of claim 1, wherein the rear side of the acoustic driver and the housing structure form the cavity, and the front side of the acoustic driver is configured with a protection structure opposite to the diaphragm.

12. The acoustic output apparatus of claim 11, wherein the protection structure is configured to separate the diaphragm from the outside and transmit the sound generated by the diaphragm to the outside.

13. The acoustic output apparatus of claim 11, wherein the protection structure includes a filter net structure.

14. The acoustic output apparatus of claim 11, wherein the protection structure includes a plate structure with at least one sound guiding hole.

15. The acoustic output apparatus of claim 1, wherein the cavity guides the sound to the outside of the acoustic output apparatus via a first sound guiding hole, a side of the acoustic driver that does not form the cavity guides the sound to the outside of the acoustic output apparatus through a second sound guiding hole, and the first sound guiding hole and the second sound guiding hole have different acoustic impedances.

16. The acoustic output apparatus of claim 1, wherein a sound path from one side of the front side and the rear side of the acoustic driver with a larger amplitude of high-frequency response to an ear is less than a sound path from the other side of the front side and the rear side to the ear.

17. The acoustic output apparatus of claim 1, wherein one side of the front side and the rear side of the acoustic driver with a larger amplitude of high-frequency response faces an ear canal.

18. An acoustic output apparatus, comprising:
an acoustic driver including a diaphragm and a magnetic circuit structure, wherein a front side of the acoustic driver is formed at a side of the diaphragm away from the magnetic circuit structure, a rear side of the acoustic driver is formed at a side of the magnetic circuit structure away from the diaphragm, and the diaphragm vibrates to cause the acoustic driver to radiate sound outward directly from the front side and the rear side of the acoustic driver, wherein
the magnetic circuit structure includes a magnetic conduction plate arranged opposite to the diaphragm, the magnetic conduction plate includes at least one sound guiding hole, and the at least one sound guiding hole guides the sound generated by the vibration of the diaphragm from the rear side of the acoustic driver to the outside of the acoustic output apparatus, wherein
the at least one sound guiding hole includes a first hole portion and a second hole portion sequentially arranged from inside to outside, the first hole portion penetrates through the second hole portion, and a diameter of the second hole portion is larger than a diameter of the first hole portion.

* * * * *